(12) United States Patent
Shin et al.

(10) Patent No.: US 8,427,511 B2
(45) Date of Patent: Apr. 23, 2013

(54) MOBILE TERMINAL WITH IMAGE PROJECTION

(75) Inventors: Duck Moon Shin, Seoul (KR); Jong Hwan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 12/357,752

(22) Filed: Jan. 22, 2009

(65) Prior Publication Data

US 2010/0188428 A1  Jul. 29, 2010

(30) Foreign Application Priority Data

Oct. 15, 2008 (KR) ........................ 10-2008-0101104

(51) Int. Cl.
*G09G 5/373* (2006.01)
*H04B 1/38* (2006.01)

(52) U.S. Cl.
USPC ............. 345/661; 345/156; 345/1.1; 345/2.2; 345/3.4; 455/566; 455/158.4; 455/557; 715/863

(58) Field of Classification Search ........................ None
See application file for complete search history.

(56) References Cited

U.S. PATENT DOCUMENTS

| | | |
|---|---|---|
| 2005/0041216 A1* | 2/2005 | Kobayashi ...................... 353/69 |
| 2006/0248447 A1* | 11/2006 | Makkonen ..................... 715/513 |
| 2007/0115363 A1* | 5/2007 | Nakamura ............... 348/208.14 |
| 2008/0005703 A1* | 1/2008 | Radivojevic et al. ......... 715/863 |
| 2008/0018591 A1* | 1/2008 | Pittel et al. ..................... 345/156 |
| 2009/0189980 A1* | 7/2009 | Kim .............................. 348/143 |
| 2009/0303176 A1* | 12/2009 | Chen et al. .................... 345/156 |

* cited by examiner

*Primary Examiner* — Marcos Batista
*Assistant Examiner* — Keith Fang
(74) *Attorney, Agent, or Firm* — Lee, Hong, Degerman, Kang & Waimey

(57) ABSTRACT

A mobile terminal is provided including a projector module, a camera, and a controller. The projector module is configured to project an image for display on an external screen. The camera is configured to receive an input image of the image displayed on the external screen. The input image includes a pointer located over the image and a shadow of the pointer. The controller is configured to obtain a distance between the pointer and the shadow of the pointer from the input image, to recognize a touch by the pointer to a touch point in the displayed image according to the obtained distance, to project through the projector module a pointer cursor at the touch point, and to perform an operation corresponding to the recognized touch point.

22 Claims, 37 Drawing Sheets

MOBILE TERMINAL WITH IMAGE PROJECTION

CROSS-REFERENCE TO RELATED APPLICATIONS

Pursuant to 35 U.S.C. §119(a), this application claims the benefit of earlier filing date and right of priority to Korean Application No. 10-2008-0101104, filed on Oct. 15, 2008, the contents of which are incorporated by reference herein in its entirety.

FIELD OF THE INVENTION

The present invention relates to a mobile terminal, and more particularly, to image projection and manipulation in the mobile terminal.

DISCUSSION OF THE RELATED ART

Generally, terminals can be classified into mobile/portable terminals and stationary terminals. The mobile terminals can be classified into handheld terminals and vehicle mount terminals depending on whether the mobile terminal can be held in a user's hand or mounted within a vehicle.

As functions of the mobile terminal diversify, the mobile terminal is increasingly implemented as a multimedia player provided with composite functions such as photographing of photos or moving pictures, the playback of music or moving picture files, game play, and broadcast reception.

To support and increase functions of the mobile terminal, improvement of structural parts and/or software parts of the mobile terminal may be considered.

In general, a mobile terminal provided with a projector function is able to project an image, which is displayed on a mobile terminal screen, to an external screen. Such a mobile terminal is able to control an image display on the external screen according to a display control signal inputted to the mobile terminal by a user. If a mobile terminal is provided with a touchscreen, the mobile terminal is able to control an image display on an external screen to correspond to a user touch action performed on the touchscreen. However, in order to control an image display on an external screen, a user has to directly manipulate the mobile terminal.

SUMMARY OF THE INVENTION

In an exemplary embodiment of the present invention, a mobile terminal is provided including a projector module, a camera, and a controller. The projector module is configured to project an image for display on an external screen. The camera is configured to receive an input image of the image displayed on the external screen. The input image includes a pointer located over the image and a shadow of the pointer. The controller is configured to obtain a distance between the pointer and the shadow of the pointer from the input image, to recognize a touch by the pointer to a touch point in the displayed image according to the obtained distance, to project through the projector module a pointer cursor at the touch point, and to perform an operation corresponding to the recognized touch point.

In one embodiment, the controller is configured to recognize the touch by the pointer if the obtained distance is less than a predetermined distance.

In one embodiment, the controller is configured to recognize the touch by the pointer if a specific motion of the pointer is obtained from the input image when the obtained distance is less than a predetermined distance.

In one embodiment, the controller is configured to acquire at least one of touch point information of the pointer or size information of the pointer and the shadow if the touch by the pointer is recognized to at least one point from the input image.

In one embodiment, the controller is configured to obtain a touch pattern by the pointer using at least one of the acquired touch point information or the acquired size information and the controller is configured to perform the operation corresponding to the obtained touch pattern.

In one embodiment, the controller is configured to adjust a size of the image displayed on the external screen using at least one of the acquired touch point information or the acquired size information.

In one embodiment, the controller is configured to perform at least one of enlarging/reducing display of one portion of the image, driving an application, or executing data with reference to the recognized touch point.

In one embodiment, the operation is at least one of a specific image effect addition or a specific function execution. The specific image effect addition is the display of an additional image on top of the image corresponding to the touch point and to a motion of the pointer. The specific function execution is the execution of a specific function associated with the touch point and the motion of the pointer.

In one embodiment, the controller is configured to determine an extent to which the displayed image overlaps with an external object from the input image and to adjust a size of the displayed image such that the displayed image does not overlap with the external object.

In one embodiment, the controller stops operating the camera if a touch by the pointer is not recognized for a predetermined period of time.

In one embodiment, a lens of each of the projector module and the camera is configured to face a same direction.

In one embodiment, location of the camera with respect to the projector is at a predetermined angle to detect the distance between the pointer and the shadow.

In one embodiment, the controller is configured to move the pointer cursor projected through the projector module corresponding to a motion of the pointer.

In an exemplary embodiment of the present invention, a method of recognizing a touch in a mobile terminal is provided including projecting an image on an external screen; capturing (e.g., photographing) the external screen to obtain an input image, the input image including a pointer located over the image and a shadow of the pointer; obtaining a distance between the pointer and the shadow from the input image; recognizing a touch by the pointer to a touch point in the displayed image according to the obtained distance; projecting a pointer cursor at the touch point; and performing an operation corresponding to the recognized touch point.

In one embodiment, the method further includes stopping the capturing of the external screen if a touch by the pointer is not recognized for a predetermined period of time.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF PREFERRED EMBODIMENTS

Reference will now be made in detail to exemplary embodiments of the present invention, examples of which are illustrated in the accompanying drawings. Wherever possible, the same reference numbers will be used throughout the drawings to refer to the same or like parts. The suffixes 'module' and 'unit' for the elements used in the following description are interchangeable.

Mobile terminals described in this disclosure include a mobile phone, a smart phone, a laptop computer, a digital broadcast terminal, a personal digital assistant (PDA), a portable multimedia player (PMP), and a navigation system.

The configurations according to exemplary embodiments of the present invention are also applicable to stationary terminals such as digital TVs and desktop computers.

Figure 1:
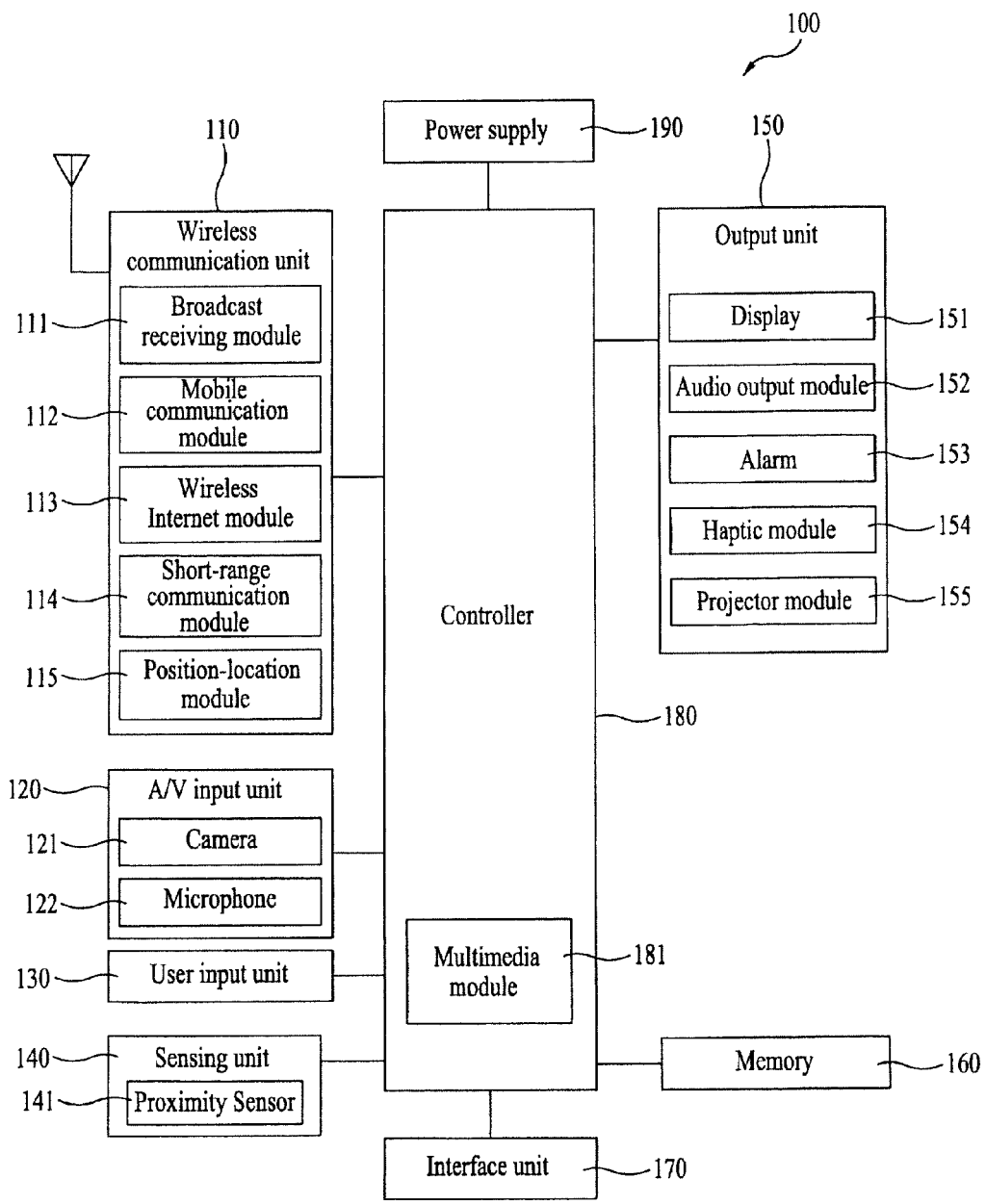
FIG. 1 is a block diagram of a mobile terminal according to one embodiment of the present invention.

FIG. 1 is a block diagram of a mobile terminal 100 according to one embodiment of the present invention. The mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but the mobile terminal 100 may have fewer components than shown in FIG. 1. That is, greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, or a data broadcast signal. If desired, the broadcast signal may further include a broadcast signal combined with a TV or radio broadcast signal.

The broadcast associated information includes information associated with a broadcast channel, a broadcast program, or a broadcast service provider. The broadcast associated information can be provided via a mobile communication network, and therefore the broadcast associated information can be received by the mobile communication module 112.

The broadcast associated information can be implemented in various forms. For instance, broadcast associated information may include an electronic program guide (EPG) of digital multimedia broadcasting (DMB) or an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server). Such wireless signals may represent audio, video, and data according to text/multimedia messages.

The wireless internet module 113 supports Internet access for the mobile terminal 100. This module may be internally or externally coupled to the mobile terminal 100. In this case, the wireless Internet technology can include WLAN (wireless LAN) (Wi-Fi), WiBro (wireless broadband), WiMAX (World Interoperability for Microwave Access), and HSDPA (High Speed Downlink Packet Access).

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth® and ZigBee™, to name a few.

The position-location module 115 identifies or otherwise obtains the location of the mobile terminal 100. If desired, this module may be implemented with a global positioning system (GPS) module.

The audio/video (NV) input unit 120 is configured to provide audio or video signal input to the mobile terminal 100. The NV input unit 120 includes a camera 121 and a microphone 122. The camera 121 receives and processes image frames of still pictures or video, which are obtained by an image sensor in a video call mode or a photographing mode. The processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100.

The microphone 122 receives an external audio signal while the portable device is in a particular mode, such as phone call mode, recording mode, or a voice recognition mode. This audio signal is processed and converted into electrical audio data. In a call mode, the processed audio data is transformed into a format transmittable to a mobile communication base station via the mobile communication module 112. The microphone 122 typically includes assorted noise removing algorithms to remove noise generated while receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, and orientation or acceleration/deceleration of the mobile terminal 100. For example, when the mobile terminal 100 is a slide-type mobile terminal, the sensing unit 140 may sense whether a sliding portion of the mobile terminal is open or closed. Other examples include the sensing unit 140 sensing the presence or absence of power provided by the power supply 190 and the presence or absence of a coupling or other connection between the interface unit 170 and an external device. The sensing unit 140 can include a proximity sensor 141.

The output unit 150 generates output relevant to the senses of sight, hearing, and touch. The output unit 150 includes the display unit 151, an audio output module 152, an alarm unit 153, a haptic module 154, and a projector module 155.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI, or the GUI.

The display module 151 may be implemented using known display technologies including, for example, a liquid crystal display (LCD), a thin film transistor-liquid crystal display (TFT-LCD), an organic light-emitting diode display (OLED), a flexible display, and a three-dimensional display. The mobile terminal 100 may include one or more of such displays.

Some of the above displays can be implemented as a transparent or optical transmittive type, which generally is called a transparent display. A transparent OLED (TOLED) is a representative example for the transparent display. A rear configuration of the display unit 151 can be implemented in the optical transmittive type as well. In this configuration, a user is able to see an object in the rear of a terminal body via the area occupied by the display unit 151 of the terminal body.

At least two display units 151 can be provided to the mobile terminal 100 in accordance with an embodiment of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

If the display unit 151 and a sensor for detecting a touch action (hereinafter called 'touch sensor') are configured as a mutual layer structure (hereinafter called 'touchscreen'), the mobile terminal 100 is able to use the display unit 151 as an input device as well as an output device. The touch sensor can be configured as a touch film, a touch sheet, or a touchpad.

The touch sensor can be configured to convert a pressure applied to a specific portion of the display unit 151 or a variation of a capacitance generated from a specific portion of the display unit 151 to an electrical input signal. Moreover, touch sensor is able to detect a pressure of a touch as well as a touched position or distance.

If a touch input is made to the touch sensor, a signal(s) corresponding to the touch is transferred to a touch controller. The touch controller processes the signal(s) and then transfers the processed signal(s) to the controller 180. Accordingly, the controller 180 is able to know whether a prescribed portion of the display unit 151 is touched.

A proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor 141 using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. If the touchscreen includes an electrostatic capacity proximity sensor, the touchscreen is configured to detect the proximity of a pointer using a variation of electric field according to the proximity of the pointer. In this case, the touchscreen (touch sensor) can be classified as the proximity sensor.

In the following description, a "proximity touch" is an action in which a pointer approaches the touchscreen without contacting with the touchscreen, but is recognized as a touch of the touchscreen. In addition, a "proximity touch" is an action in which a pointer actually touches the touchscreen. The position on the touchscreen proximity-touched by the pointer is the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, or a proximity touch shift state). Information corresponding to the detected proximity touch action and the detected proximity touch pattern can be outputted to the touchscreen.

The audio output module 152 functions in various modes including a call-receiving mode, a call-placing mode, a recording mode, a voice recognition mode, and a broadcast reception mode and outputs audio data which is received from the wireless communication unit 110 or is stored in the memory 160. During operation, the audio output module 152 outputs audio relating to a particular function (e.g., call received, message received). The audio output module 152 is often implemented using one or more speakers, buzzers, other audio producing devices, and combinations thereof.

The alarm unit 153 output a signal for announcing the occurrence of a particular event associated with the mobile terminal 100. Typical events include a call received event, a message received event, and a touch input received event. The alarm unit 153 is able to output a signal for announcing the event occurrence by way of vibration, video signal, or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates an effect attributed to an arrangement of pins vertically moving against a contact skin surface, an injection/suction power of air though an injection/suction hole, a skim over a skin surface, a contact with an electrode, an electrostatic force, or a representation of a hot/cold sense using an endothermic or exothermic device.

The haptic module 154 can be implemented to enable a user to sense the tactile effect through a muscle sense of finger, arm, or another part of the body. Optionally, at least two haptic modules 154 can be provided in the mobile terminal 100 in accordance with the corresponding configuration type of the mobile terminal 100.

The projector module 155 is the element for performing an image projector function using the mobile terminal 100. The projector module 155 is able to display an image, which is identical to or partially different at least from the image displayed on the display unit 151, on an external screen or wall according to a control signal of the controller 180.

In particular, the projector module 155 can include a light source that generates light (e.g., laser) for projecting an image externally, an image producing means for producing an image to output externally using the light generated from the light source, and a lens for enlarging the image for output externally in a predetermined focus distance. The projector module 155 can further include a device for adjusting an image projected direction by mechanically moving the lens or the whole module.

The projector module 155 can be classified into a CRT (cathode ray tube) module, an LCD (liquid crystal display) module, and a DLP (digital light processing) module according to a device type of the display. In particular, the DLP module is operated by the mechanism of enabling the light generated from the light source to reflect on a DMD (digital micro-mirror device) chip and can be advantageous for the downsizing of the projector module 151.

The projector module 155 can be provided in a length direction of a lateral, front, or backside direction of the mobile terminal 100. The projector module 155 can be provided in any portion of the mobile terminal 100 according to need.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data (e.g., use frequency for each phonebook, each message or each multimedia) can be stored in the memory unit 160. Moreover, data for various patterns of vibration and/or sound outputted upon touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. The mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, or an earphone port.

The identity module is the chip for storing various kinds of information for authenticating a use authority of the mobile terminal 100 and can include a User Identify Module (UIM), a Subscriber Identify Module (SIM), or a Universal Subscriber Identity Module (USIM). A device having the identity module (hereinafter called 'identity device') can be manufactured as a smart card. The identity device is connectable to the mobile terminal 100 via the corresponding port.

When the mobile terminal 100 is connected to an external cradle, the interface unit 170 becomes a passage for supplying the mobile terminal 100 with power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180 or may be implemented as a separate component.

The controller 180 is able to perform a pattern recognizing process for recognizing a writing input and a picture drawing input carried out on the touchscreen as characters or images.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, each of which performs one or more of the functions and operations described herein. The software codes can be implemented with a software application written in any suitable programming language and may be stored in memory such as the memory 160, and executed by a controller or processor, such as the controller 180.

Figure 2A:
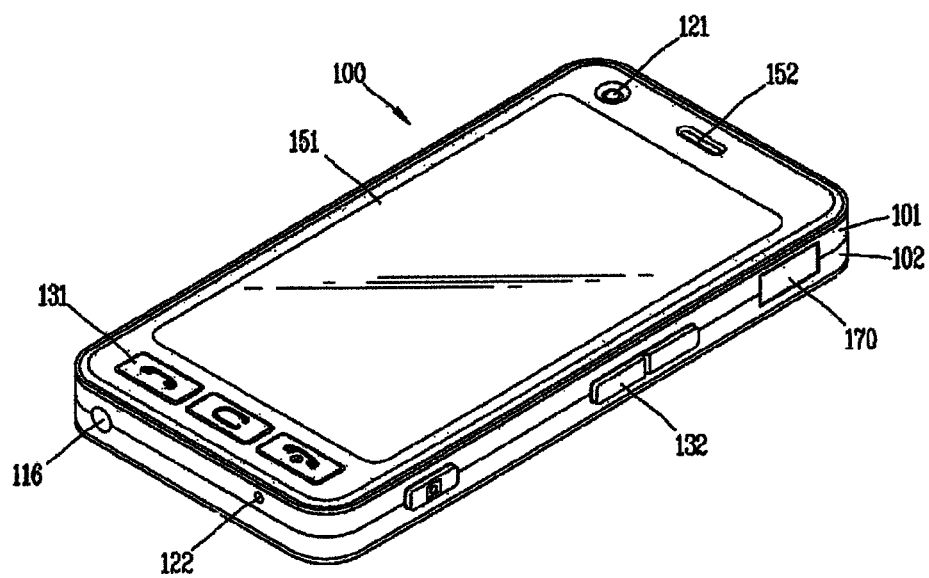
FIG. 2A is a front perspective diagram of a mobile terminal according to one embodiment of the present invention.

FIG. 2A is a front perspective diagram of a mobile terminal according to one embodiment of the present invention. The mobile terminal 100 shown in the drawing has a bar type terminal body. The mobile terminal 100 may be implemented in a variety of different configurations. Examples of such configurations include bar-type, folder-type, slide-type, rotational-type, swing-type, and combinations thereof. Further disclosure will primarily relate to a bar-type mobile terminal 100. However, the disclosure applies equally to other types of mobile terminals.

Referring to FIG. 2A, the mobile terminal 100 includes a case (casing, housing, and cover) configuring an exterior thereof. In the present embodiment, the case includes a front case 101 and a rear case 102. Various electric/electronic parts are loaded in a space provided between the front and rear cases 101 and 102. Optionally, at least one middle case can be further provided between the front and rear cases 101 and 102.

The cases 101 and 102 are formed by injection molding of synthetic resin or can be formed of a metal substance such as stainless steel (STS) or titanium (Ti).

A display unit 151, an audio output unit 152, a camera 121, user input units 131 and 132, a microphone 122, and an interface 170 can be provided in the terminal body, and more particularly, in the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided in another area adjacent to the other end portion of the display unit 151. The user input unit 132 and the interface 170 can be provided at lateral sides of the front and rear cases 101 and 102.

The input unit 130 is manipulated to receive a command for controlling an operation of the terminal 100. The input unit 130 is able to include a plurality of manipulating units 131 and 132. The manipulating units 131 and 132 are manipulating portions and may adopt any mechanism of a tactile manner that enables a user to perform a manipulation action by experiencing a tactile feeling.

Content inputted by the first or second manipulating unit 131 or 132 can be diversely set. For instance, such a command as start, end, or scroll is inputted to the first manipulating unit 131. A command for a volume adjustment of sound outputted from the audio output unit 152 or a command for a switching to a touch recognizing mode of the display unit 151 can be inputted to the second manipulating unit 132.

Figure 2B:
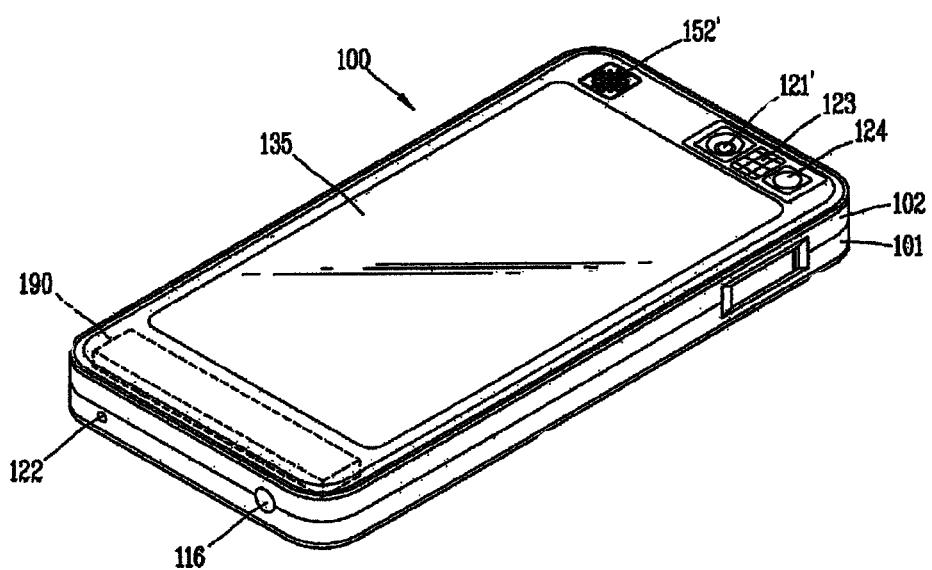
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121' has a photographing direction that is substantially opposite to that of the camera 121 shown in FIG. 2A and may have pixels differing from those of the camera 121.

In an exemplary embodiment, the former camera 121 has enough pixels to capture and transmit a picture of a user's face for a video call, while the camera 121' has a larger number of pixels for capturing a higher quality photograph. Each of the cameras 121 and 121' can be installed on the terminal body to be rotated or popped up.

A flash 123 and a mirror 124 are additionally provided adjacent to the camera 121'. The flash 123 projects light toward a subject when photographing the subject using the camera 121'. When a user attempts to take a picture of himself (self-photography) using the camera 121', the mirror 124 enables the user to view his face reflected by the mirror 124.

An additional audio output unit 152' can be provided on the backside of the terminal body. The additional audio output unit 152' is able to implement a stereo function together with the audio output unit 152 shown in FIG. 2A and may be used for implementation in a speakerphone mode while talking in the terminal.

A broadcast signal receiving antenna 124 can be additionally provided to the lateral side of the terminal body as well as an antenna for communication. The antenna 124, constructing a portion of the broadcast receiving module 111 shown in FIG. 1, can be retractably provided to the terminal body.

A power supply unit 190 for supplying power to the terminal 100 is provided in the terminal body. The power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be a light transmittive type like the display unit 151. Accordingly, if the display unit 151 is configured to output visual information from its both faces, the user will be able to recognize the visual information via the touchpad 135 as well. The information outputted from both of the faces can be entirely controlled by the touchpad 135. Alternatively, a display is further provided by the touchpad 135 so that the touchpad is a touchscreen. Accordingly, a touchscreen can be provided at the rear case 102 as well as the front case 101.

The touchpad 135 is activated by interconnecting with the display unit 151 of the front case 101. The touchpad 135 can be provided in the rear of the display unit 151 and in parallel with the display unit 151. In an exemplary embodiment, the touchpad 135 can have a size equal to or smaller than that of the display unit 151.

Figure 3A:
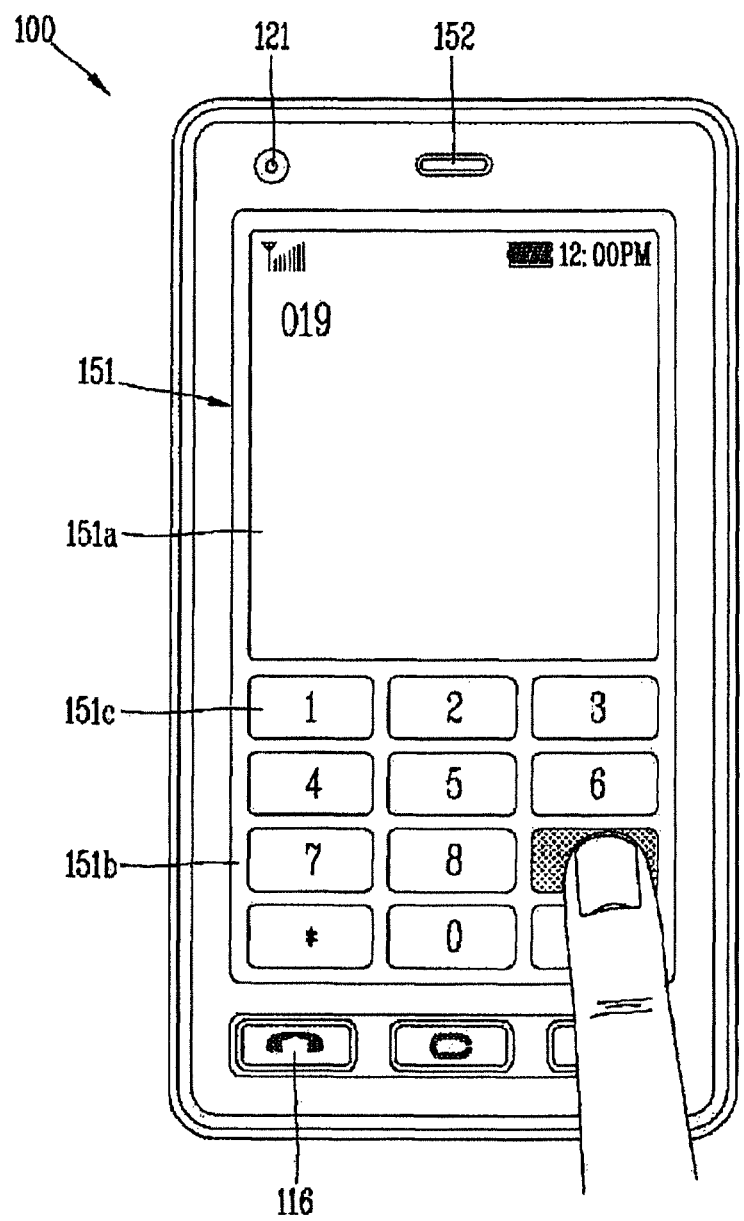
FIG. 3A and FIG. 3B are front perspective diagrams of a mobile terminal according to one embodiment of the present invention for explaining operational states of the mobile terminal.
Figure 3B:
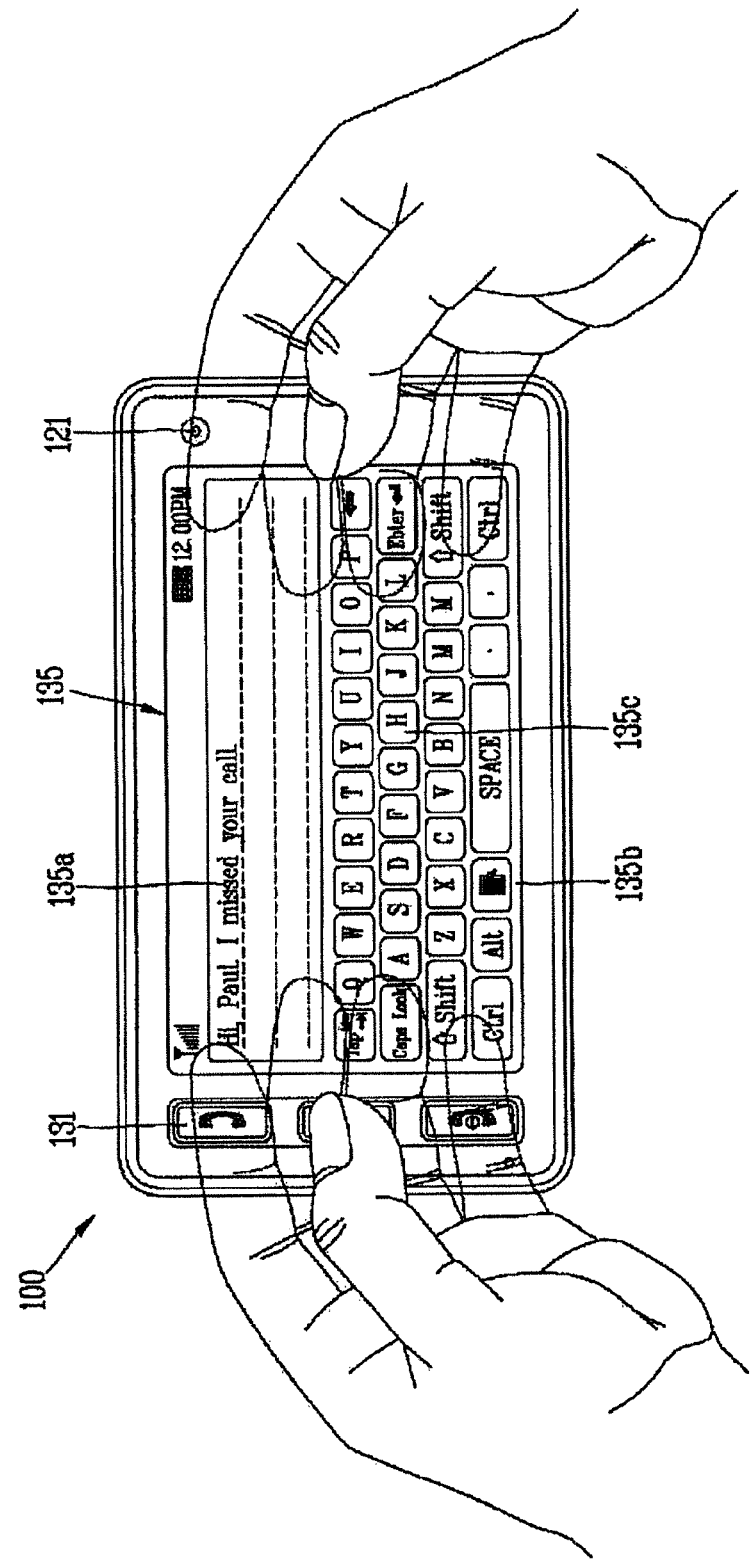

Interconnected operational mechanism between the display unit 151 and the touchpad 135 are explained with reference to FIG. 3A and FIG. 3B. FIG. 3A and FIG. 3B are front perspective diagrams of a terminal according to one embodiment of the present invention for explaining operational states of the mobile terminal. Various kinds of visual information can be displayed on the display unit 151. This information can be displayed in characters, numerals, symbols, graphics, or icons.

In order to input the information, at least one of the characters, numerals, symbols, graphics, and icons are represented as a single predetermined array to be implemented in a keypad formation. Such a keypad formation can be so-called "soft keys." FIG. 3A shows activating the soft key "9" via touch inputted through a front face of a terminal body.

The display unit 151 is operable through an entire area or by being divided into a plurality of regions. In the latter case, the plurality of the regions can be configured interoperably. For instance, an output window 151a and an input window 151b are displayed on the display unit 151. Soft keys 151c' representing digits for inputting a phone number are outputted to the input window 151b. If a soft key 151c' is touched, a digit corresponding to the touched soft key is outputted to the output window 151a. If the first manipulating unit 131 is manipulated, a call connection for the phone number displayed on the output window 151a is attempted.

FIG. 3B shows activating a soft key via touch inputted through a rear face of a terminal body. FIG. 3A depicts a terminal body arranged vertically in a portrait mode. FIG. 3B depicts a terminal body arranged horizontally in a landscape mode. The display unit 151 can be configured to change an output picture according to the arranged direction of the terminal body.

FIG. 3B shows that a text input mode is activated in the terminal. An output window 135a and an input window 135b are displayed on the touchpad 135 of the display unit 151. A plurality of soft keys 135c representing at least one of characters, symbols, or digits can be arranged in the input window 135b. The soft keys 135c can be arranged in the QWERTY key formation.

If the soft keys 135c are touched through the touchpad 135, the characters, symbols, and digits corresponding to the touched soft keys are outputted to the output window 135a. Thus, the touch input via the touchpad 135, as compared to the touch input via the display unit 151, is more advantageous in that the soft keys 135c can be prevented from being blocked by a finger when being touch. If the display unit 151 and the touchpad 135 are configured to be transparent, the touchpad 135 is able to visually check fingers located at the backside of the terminal body. Accordingly, more accurate touch inputs are possible.

The display unit 151 or the touchpad 135 can be configured to receive a scroll touch input. A user scrolls the display unit 151 or the touchpad 135 to shift a cursor or a pointer located at an entity (e.g., icon) displayed on the display unit 151. Furthermore, if a finger is shifted on the display unit 151 or the touchpad 135, a path of the shifted finger can be visually displayed on the display unit 151. Such functionality may be useful in editing an image displayed on the display unit 151.

If both the display unit (touchscreen) 151 and the touchpad 135 are touched within a predetermined time range, a particular function of the terminal can be executed. Such simultaneous touch may correspond to when the terminal body is held by a user using a thumb and a first finger (clamping). The above function can include activation or deactivation for the display unit 151 and/or the touchpad 135.

Figure 4:
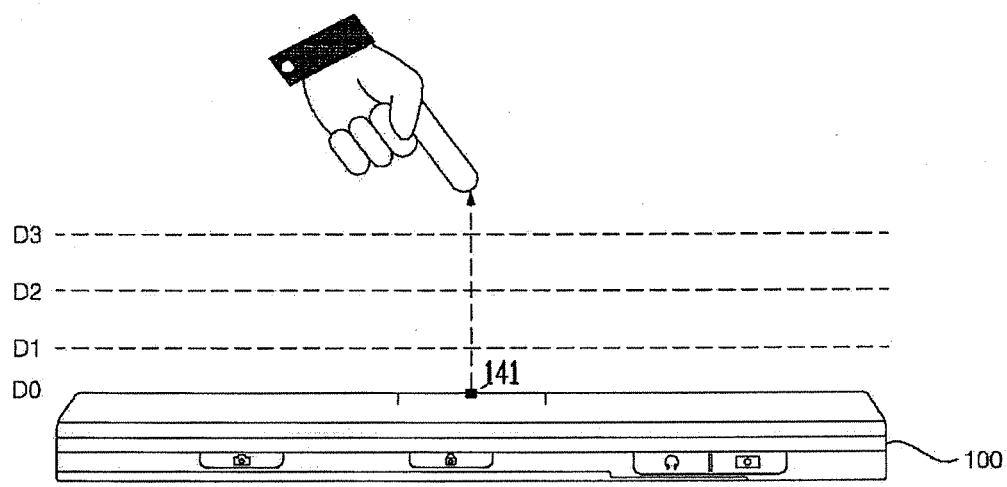
FIG. 4 is a diagram illustrating the concept of proximity depth of a proximity sensor.

FIG. 4 is a diagram for illustrating a proximity depth of the proximity sensor 141. When a pointer, such as a user's finger or a pen, approaches the touchscreen, a proximity sensor 141 provided within or in the vicinity of the touchscreen detects the approach of the pointer and then outputs a proximity signal. The proximity sensor 141 can be configured to output a different proximity signal according to a distance/proximity depth between the pointer and the touchscreen.

In FIG. 4, according to an exemplary embodiment of the present invention, a cross-section of the touchscreen is provided depicting a proximity sensor capable of sensing three proximity depths. However, the present invention is not thus limited and the proximity sensor can be configured to sense less than three proximity depths or four or more proximity depths.

If the pointer fully contacts the touchscreen (d0), the contact is recognized as a contact touch. If the pointer is located to be spaced apart from the touchscreen by a distance less than d1, the pointer approach is recognized as a proximity touch at the first proximity depth. If the pointer is located to be spaced apart from the touchscreen by a distance less than d2 but greater than or equal to d1, the pointer approach is recognized as a proximity touch at the second proximity depth. If the pointer is located to be spaced apart from the touchscreen by a distance less than d3 but greater than or equal to d2, the pointer approach is recognized as a proximity touch at the third proximity depth. If the pointer is located to be spaced apart from the touchscreen by a distance greater than or equal to d3, the pointer is recognized as being outside of the range of a proximity touch.

Accordingly, the controller 180 is able to recognize the proximity touch as one of various input signals according to the proximity depth and position of the pointer. The controller 180 is able to perform various operation controls according to the various input signals.

Figure 5:
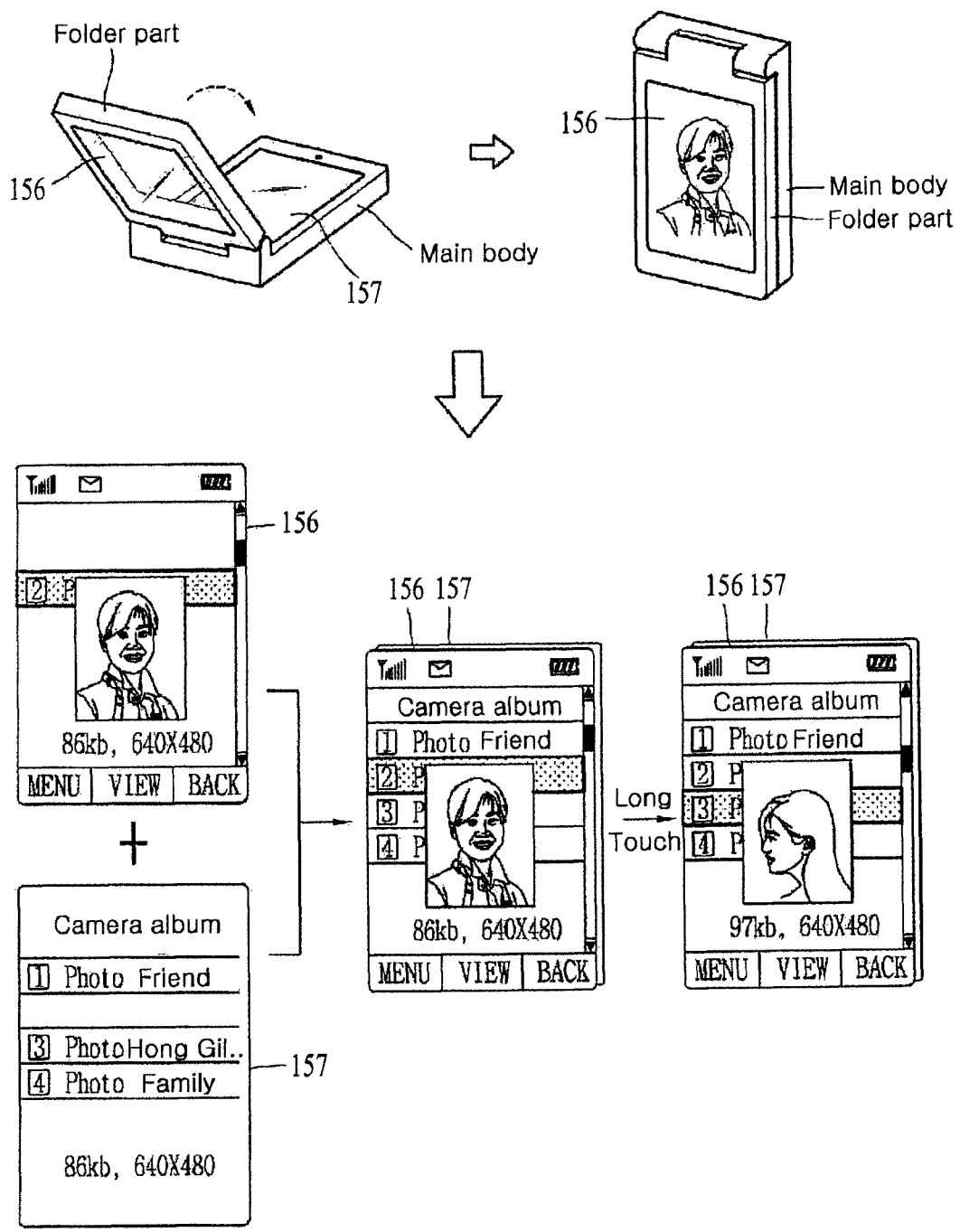
FIG. 5 is a diagram illustrating the concept of a method of controlling a touch action on a pair of overlapping display units.

FIG. 5 is a diagram illustrating a method of controlling a touch action on a pair of overlapping display units 156, 157. The terminal of FIG. 5 is a folder type terminal in which a folder part is hingedly connected to a main body such that the folder part can be folded into the main body or unfolded away from the main body.

The first display unit 156 provided in the folder part is a light-transmittive display or transparent type display such as a TOLED, while the second display unit 157 provided in the main body may be a non-transmittive type display such as an LCD. Each of the first and second display units 156 and 157 can include a touch-inputtable touchscreen.

For instance, if a touch (contact touch or proximity touch) to the first display unit or TOLED 156 is detected, the controller 180 selects or runs at least one image from an image list displayed on the TOLED 156 according to a touch type and a touch duration.

In the following description, a method of controlling information on LCD 157 (which is a different display than TOLED 156) when a touch is detected to the TOLED 156, which is externally exposed in an overlapped configuration, is explained. In the following description, touch input types are classified into a touch, a long touch, and a long-touch & drag.

In the overlapped state (i.e., a state in which the mobile terminal is closed or folded), the TOLED 156 is configured to be overlapped with the LCD 157. In this state, if a touch different from a touch for controlling an image displayed on the TOLED 156 is detected (e.g., a long touch—a touch having a duration of at least 2 seconds), the controller 180 enables at least one image to be selected from an image list displayed on the LCD 157 according to the touched touch input. The result from executing the selected image is displayed on the TOLED 156.

The long touch is usable in selectively shifting a specific one of the entities displayed on the LCD 157 to the TOLED 156 (without an action for executing the corresponding entity). In particular, if a user performs a long touch on a prescribed region of the TOLED 156 corresponding to a specific entity of the LCD 157, the controller 180 controls the corresponding entity to be displayed by being shifted to the TOLED 156. An entity displayed on the TOLED 156 can be displayed by being shifted to the LCD 157 according to a touch input to the TOLED 156, such as flicking and swirling.

As shown in FIG. 5, a second menu displayed on the LCD 157 is shifted to the TOLED 156 and displayed on the TOLED 156. If another input, such as a drag, is additionally detected together with a long touch, the controller 180 executes a function associated with an image selected by the long touch so that a preview picture for the image can be displayed on the TOLED 156. As depicted in FIG. 5, a preview (picture of a male) for a second menu (image file) is performed.

While the preview image is outputted, if a drag toward a different image is additionally performed on the TOLED 156 by maintaining the long touch, the controller 180 shifts a selection cursor (or a selection bar) of the LCD 157 and then displays the image selected by the selection cursor on the preview picture (picture of female). Thereafter, after completion of the touch (long touch and drag), the controller 180 displays the initial image selected by the long touch.

The function of the long touch and drag and the function of a slide action (i.e., action of a proximity touch corresponding to the drag) together with a long proximity touch (e.g., a proximity touch maintained for at least 2 or 3 seconds) to the TOLED 156 are identical.

If a touch action differing from the above-mentioned touch actions is detected, the controller 180 is able to operate in a manner according to the general touch controlling method.

The method of controlling the touch action in the overlapped state is applicable to a terminal having a single display.

The method of controlling the touch action in the overlapped state is applicable to terminals differing from the folder type terminal having a dual display as well.

Figure 6A:
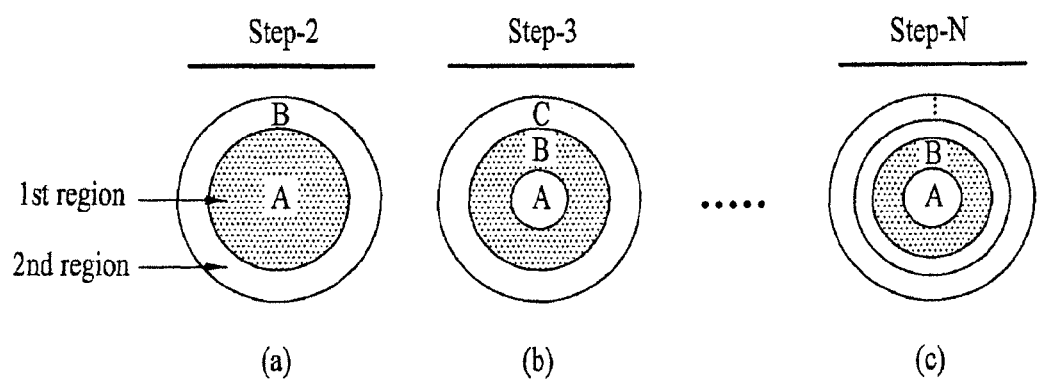
FIG. 6A and FIG. 6B are diagrams illustrating the concepts of a proximity touch recognizing area for detecting a proximity signal and a haptic area for generating a tactile effect.
Figure 6B:
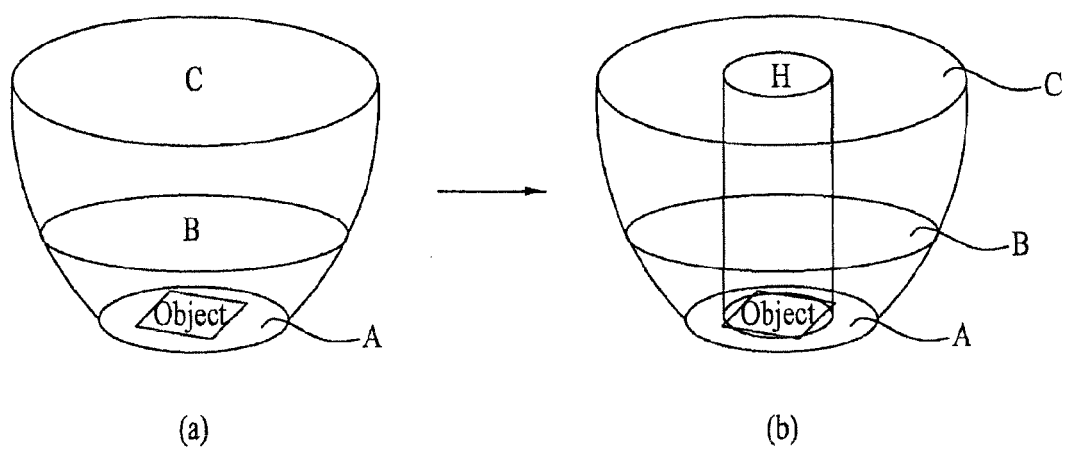

FIG. 6A and FIG. 6B are diagrams for illustrating a proximity touch recognition area and a tactile effect generation region. FIG. 6A represents an object such as an icon or a menu item as a circle. However, the object and the corresponding region can have any shape.

A region for displaying an object on the display unit 151, as shown in (a) of FIG. 6A, can be divided into a first region A at a central part and a second region B enclosing the first region A. The first and second regions A and B can be configured to generate tactile effects differing from each other in strength or pattern. For instance, the first and second regions can be configured to generate 2-step vibrations in a manner of outputting a first vibration if the second region B is touched or outputting a second vibration greater than the first vibration if the first region A is touched.

If both of the proximity touch recognition region and the haptic region are simultaneously set in the region having the object displayed therein, the sensing unit 140 is able to set the haptic region for generating the tactile effect to be different from the proximity touch recognition region for detecting the proximity signal. In particular, the sensing unit 140 is able to set the haptic region to be narrower or wider than the proximity touch recognition region. For instance, in (a) of FIG. 6A, the sensing unit 140 is able to set the proximity touch recognition region to the area including both of the first and second regions A and B. In addition, the sensing unit 140 is able to set the haptic region to the first region A.

The sensing unit 140 is able to discriminate the region having the object displayed therein into three regions A, B and C as shown in (b) of FIG. 6A. Alternatively, the sensing unit 140 is able to discriminate the region having the object displayed therein into N regions (N>4) as shown in (c) of FIG. 6A. In addition, the sensing unit 140 is able to configure each of the divided regions to generate a tactile effect having a different strength or pattern. If a region having a single object represented therein is divided into at least three regions, the sensing unit is able to set the haptic region and the proximity touch recognition region to differ from each other according to a use environment.

The sensing unit 140 is able to configure a size of the proximity touch recognition region of the display unit 151 to vary according to a proximity depth. In particular, referring to (a) of FIG. 6B, the proximity touch recognition region is configured to decrease by C→B→A according to the proximity depth for the display unit 151. On the contrary, the proximity touch recognition region is configured to increase by C→B→A according to the proximity depth for the display unit 151. Despite the above configuration, the sensing unit 140 is able to set the haptic region to have a predetermined size, as the region 'H' shown in (b) of FIG. 6B, regardless of the proximity depth for the display unit 151.

When dividing the object-displayed region for the setting of the haptic region or the proximity touch recognition region, the sensing unit 140 is able to use one of various schemes of horizontal/vertical division, radial division and combinations thereof as well as the concentric circle type division shown in FIG. 6A.

Figure 7A:
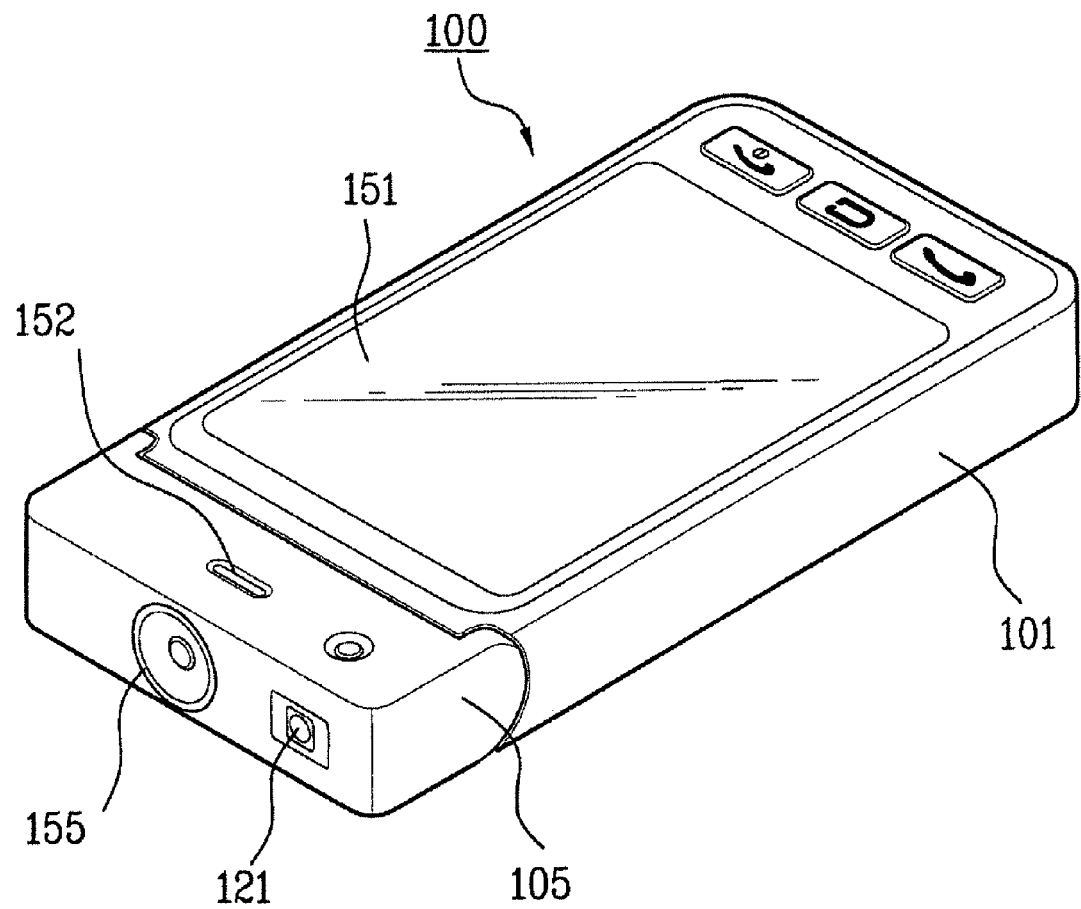
FIG. 7A and FIG. 7B are perspective diagrams of a mobile terminal according to one embodiment of the present invention.
Figure 7B:
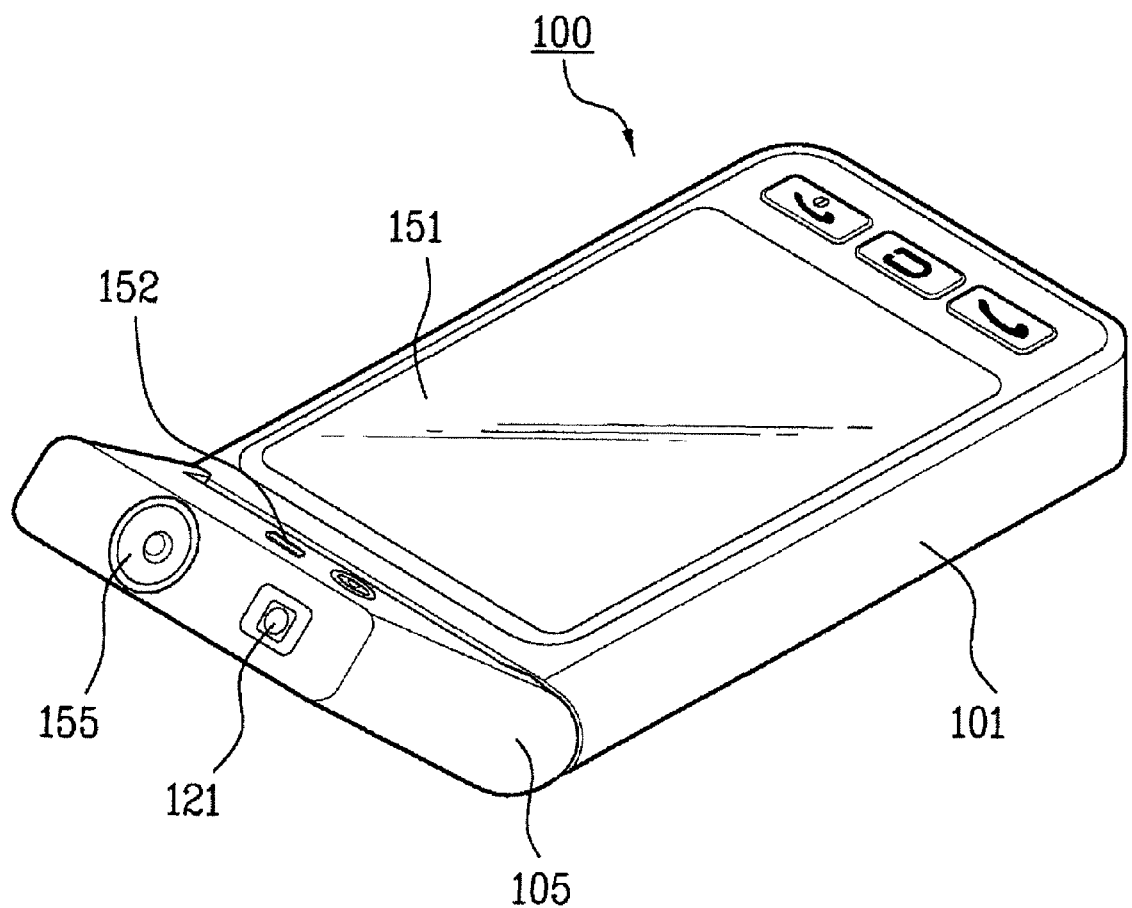

In the following description, the configuration of the above-described projector module provided to the bar type mobile terminal 100 is explained in detail with reference to FIG. 7A and FIG. 7B. FIG. 7A and FIG. 7B are perspective diagrams of a mobile terminal according to one embodiment of the present invention. Referring to FIG. 7A, a projector body 105 having a projector module 155 can be rotatably coupled to a main body 101 of the mobile terminal. In particular, the projector body 105 can be hinged to the main body 101. A projected angle of an image, which is projected using the projector module 155 provided to the projector body 101, can be controlled. In an exemplary embodiment, the projector module 155 projects with a laser beam. A camera 121 can be provided to the projector body 105 to photograph the image projected by the projector module 155. FIG. 7A shows a status before the projector body 105 is rotated. The projector body is rotatably coupled to the main body 101. FIG. 7B shows a status after the projector body 105 has been rotated.

In an exemplary embodiment of the present invention, the mobile terminal includes the projector module 155 and at least one element shown in FIG. 1. In another exemplary embodiment, the at least one element includes camera 121.

Figure 8:
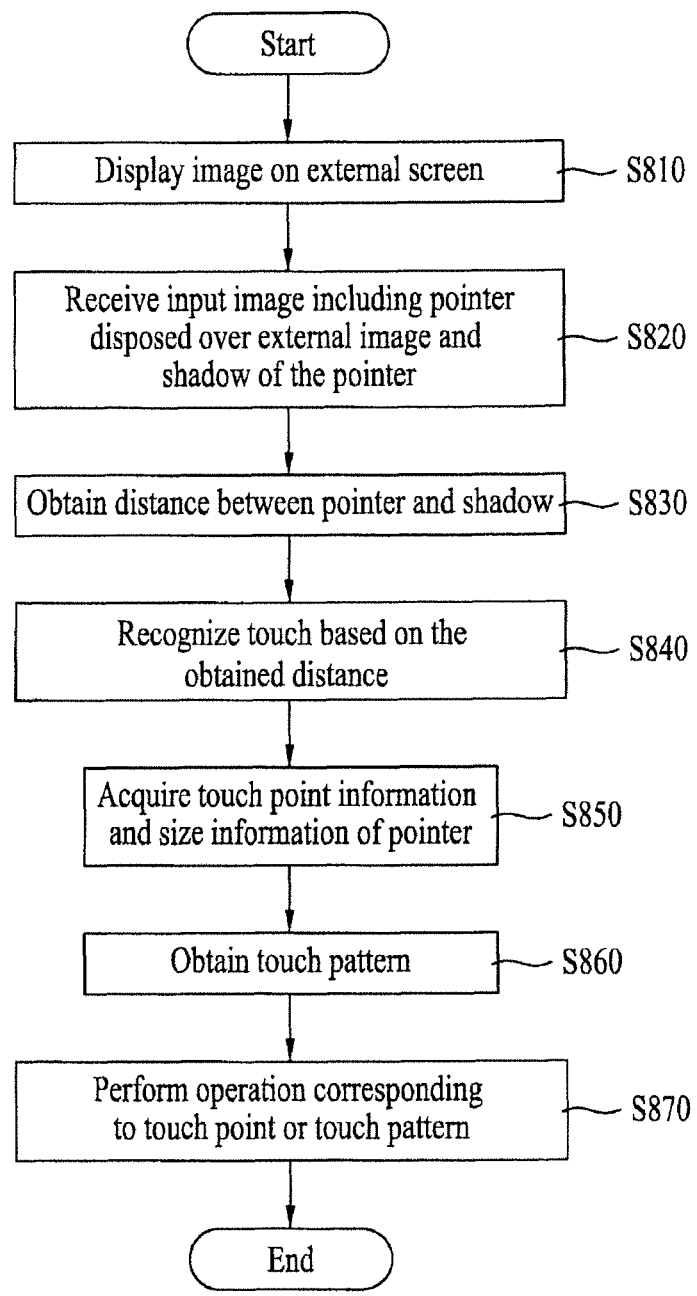
FIG. 8 is a flowchart for a method of recognizing a touch in a mobile terminal according to one embodiment of the present invention.

FIG. 8 is a flowchart for a method of recognizing a touch in a mobile terminal according to one embodiment of the present invention. Referring to FIG. 8, if a projector function is activated according to a selection made by a user, the mobile terminal 100 is able to display an image on an external screen using the projector module 155 [S810].

The controller is able to control the projector function activation and the overall operations of the projector module 155. As the projector function is activated, the controller 180 sets the projector module 155 to enter an operable mode. The projector module 155 is then set to enter a mode capable of displaying an image on the external screen under the control of the controller 180.

The projector function may be the function of displaying an image, which is stored in the memory 160 or is received from an external terminal via the wireless communication unit 110, on the external screen using the projector module 155 provided to the mobile terminal 100. The external screen includes all kinds of means for displaying an image projected by the projector module 155 and is not limited by its name or type.

For instance, if a user selects a projector function execution command key, which is a menu item of 'projector function execution' through a menu search, the projector function can be activated.

An image displayed on the external screen (hereinafter called 'external image') may coincide with an image displayed on a whole or partial screen of the mobile terminal or may not be displayed on the mobile terminal screen.

The mobile terminal 100 receives an input of an image (hereinafter called 'input image') including a pointer disposed over an external image and a shadow of the pointer using the camera 121 [S820].

In this case, when a user directs a prescribed point of an external image using a pointer (e.g., user's finger, pencil, or rod), it can be said that the pointer is disposed over the external image.

If a drive of the projector module 155 is detected or a camera drive command signal is inputted via the user input unit 130 by a user, the controller 180 is able to set the camera 121 to enter a mode for receiving an input of an image externally.

An image input range of the camera 121 may be equal to or greater than a display area of the external image. Moreover, the controller 180 is able to adjust the image input range of the camera 121 to enable the input image to be inputted in a manner of adjusting a focal distance.

The camera 121 and the projector module 155 can be provided to the mobile terminal 100 in a manner that their lenses are configured to face the same direction. This is to receive an input image including a pointer disposed over an external image displayed using the projector module 155 and a shadow of the pointer via the camera 121.

In an exemplary embodiment, when the pointer is an index finger, the mobile station recognizes relative movement of the index finger and the corresponding thumb. As such, a user may indicate an action (e.g., selection, activation) to be performed by the mobile terminal using the user's index finger and a movement of the user's thumb, such as touching the thumb to the index finger or clicking/snapping the thumb and the index finger together. As such, the mobile station recognizes a presenter's index finger as the pointer and determines the pointer location on the external image using the shadow of the pointer. The mobile terminal is able to recognize the movement of the thumb with respect to the index finger. A particular movement of the thumb with respect to the index finger can signal an action to be performed with respect to the location on the external image pointed to by the pointer. For example, if the index finger is pointed to a newspaper headline, and the thumb is moved with respect to the index finger (e.g., touching, clicking, or snapping), then the entire headline article may be displayed on the external screen.

Figure 9A:
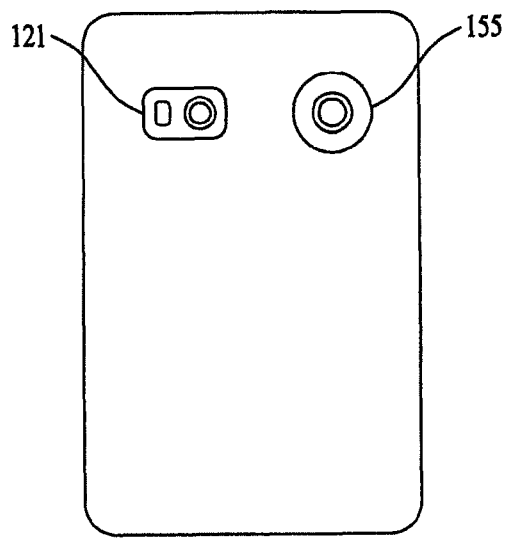
FIG. 9A and FIG. 9B are diagrams of a camera and a projector module provided in a mobile terminal according to one embodiment of the present invention.
Figure 9B:
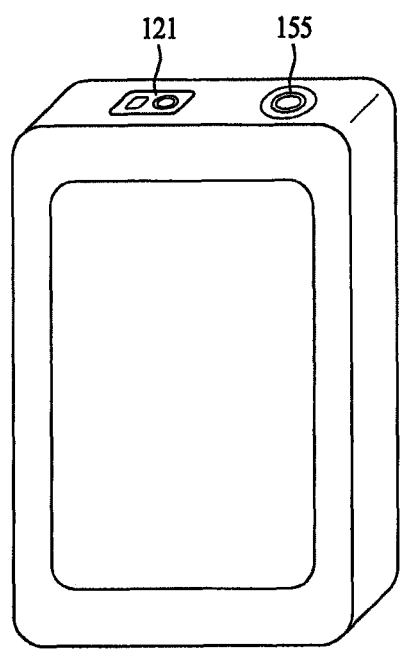

Referring to FIG. 9A or FIG. 9B, the lens of the camera 121 and the lens of the projector module 155 can be provided on a backside (FIG. 9A) or on a prescribed lateral side (FIG. 9B) of the mobile terminal 100.

The mobile terminal 100 obtains a distance between the pointer and the shadow from the input image inputted in the inputting step S820 under the control of the controller 180 [S830]. In particular, the mobile terminal 100 is able to obtain the distance between the pointer and the shadow with reference to an end portion of the pointer facing the external screen. The controller 180 is able to obtain the distance between the pointer and the shadow by recognizing each of the pointer and the shadow from the input image. In particular, the controller 180 is able to recognize the pointer and the shadow from the input image using the object recognizing technology. In this case, the object recognizing technology can include a detecting technology, a tracking technology, and an identifying technology.

For instance, the detecting technology is the technology of detecting an image part corresponding to each of the pointer and the shadow from the input image. Therefore, the controller 180 is able to obtain the distance between the pointer and the shadow using the image parts of the pointer and shadow detected from the input image.

The tracking technology is the technology of detecting a pointer and its shadow by tracking the pointer and shadow in an input image according to motions of the pointer and shadow while image parts corresponding to the pointer and shadow are detected from the input image. Therefore, even if the pointer and shadow are moving, the controller 180 is able to obtain a distance between the pointer and the shadow using the input image.

The identifying image is the technology of matching image parts of a pointer and shadow detected from an input image with previously stored image parts via comparison. Therefore, the controller 180 compares the currently detected image parts of the pointer and shadow to the previously stored image parts and is then able to obtain position and size variations of the pointer and shadow.

In recognizing or obtaining the distance between the pointer and the shadow, the controller 180 is able to obtain a distance between a real pointer and a real shadow (hereinafter called 'real distance') in a manner of determining a ratio of a real external image to an external image included in an input image (hereinafter called 'input external image') and then applying the determined ratio to a distance between a pointer and a shadow on the input image (hereinafter called 'input distance').

For instance, if a ratio of a real external image to an input external image is 10:1, assuming that an input distance is 0.5 cm, it is able to obtain a real distance amounting to 5 cm.

Under the control of the controller 180, the mobile terminal 100 is able to recognize a touch to a point of an external image pointed by the pointer according to an extent of the pointer-to-shadow distance obtained in the obtaining step S830 [S840].

If the obtained distance between the pointer and the shadow lies within a predetermined distance, the mobile terminal 100 is able to recognize the touch to the point indicated by the pointer.

If the distance between the pointer and the shadow is less than or equal to the predetermined distance, a prescribed point of the external image is considered to be touched by the pointer.

Figure 10:
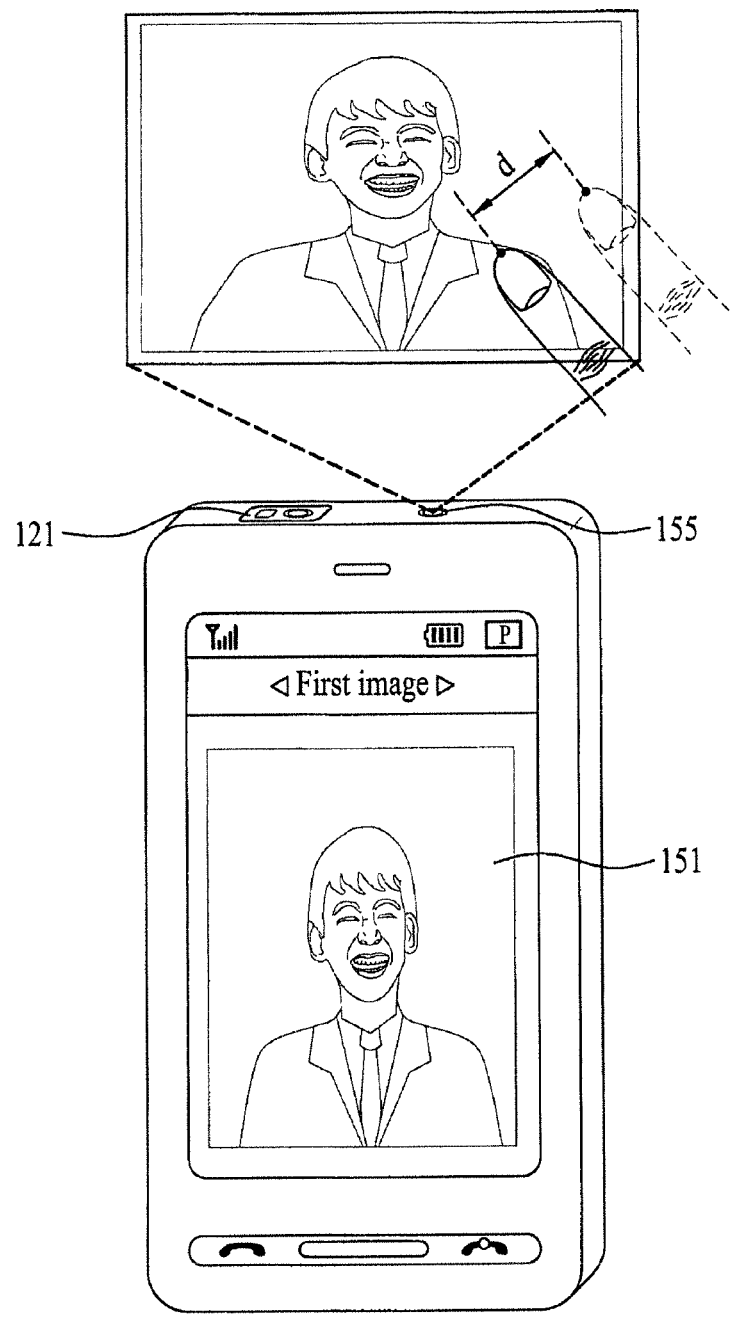
FIG. 10 is a diagram for recognizing a touch point to an extent of a distance between a pointer and a shadow according to one embodiment of the present invention.

For instance, referring to FIG. 10, if a distance between a pointer (or, an end portion of the pointer located toward the external image) and a shadow of the pointer lies within a predetermined distance d, the mobile terminal 100 is able to recognize a touch to a point of the external image pointed by the pointer.

If a pointer (or, an end portion of the pointer located toward the external image) is overlapped with its shadow, the mobile terminal 100 is able to recognize a touch to a point of the external image pointed by the pointer.

Figure 11A:
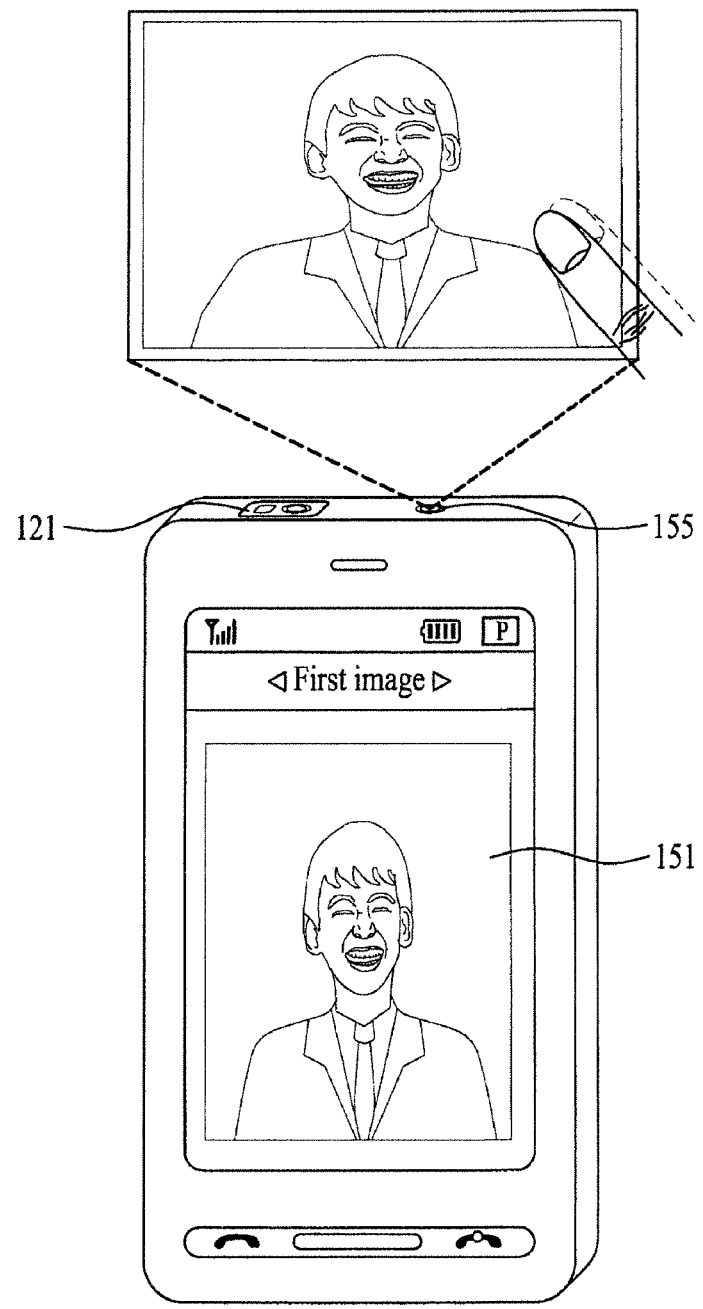
FIG. 11A, FIG. 11B, and FIG. 11C are diagrams for a touch recognizing process according to one embodiment of the present invention.

For instance, referring to FIG. 11A, if a pointer and its shadow are overlapped at a point of the external image pointed by the pointer, the mobile terminal 100 is able to recognize a touch to the point of the external image pointed by the pointer.

When a distance between a pointer (or, an end portion of the pointer located toward the external image) and a shadow of the pointer lies within a predetermined distance or the pointer and the shadow are overlapped with each other and a specific motion of the pointer is obtained, the mobile terminal 100 is able to recognize a touch to the point of the external image pointed by the pointer.

Figure 11B:
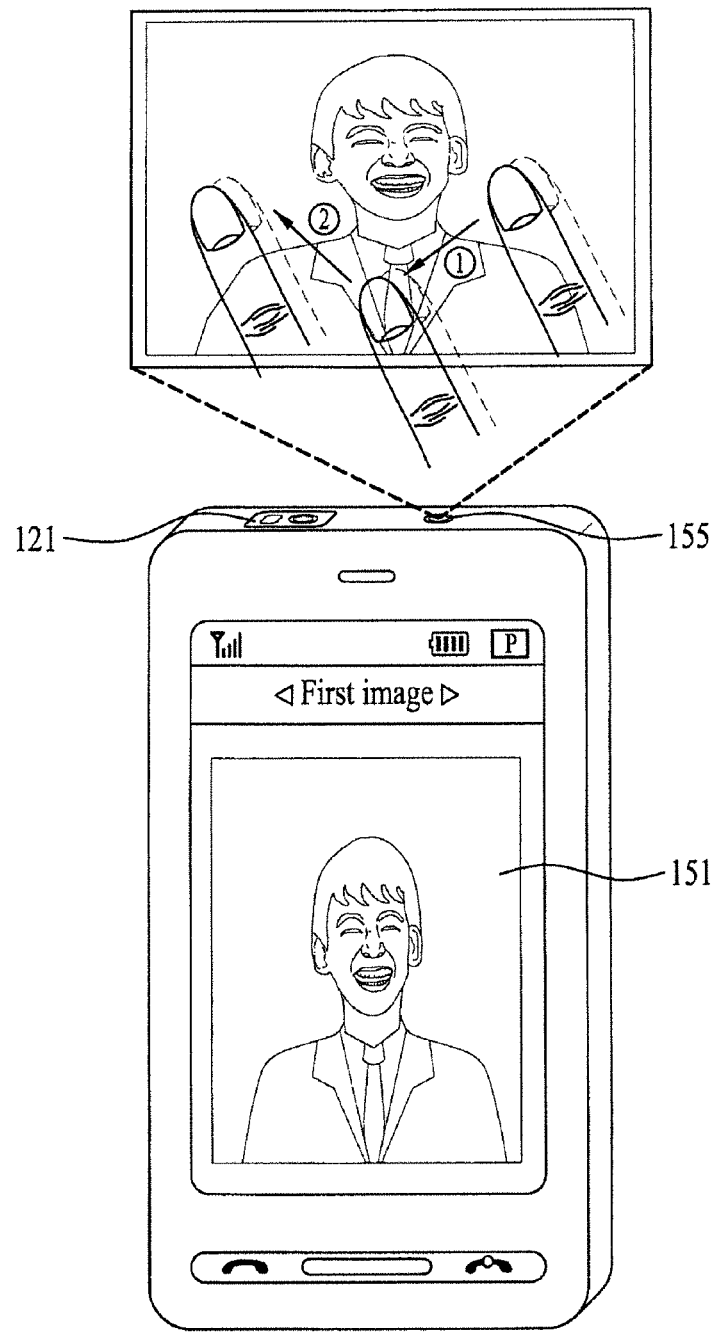

For instance, referring to FIG. 11B, while a pointer and a shadow are overlapped with each other, if a pointer motion in directions (1) and (2) sequentially is obtained, the mobile terminal 100 is able to recognize a touch to the point of the external image pointed by the pointer.

Moreover, the mobile terminal 100 is able to output a text announcing that touch recognition is available, according to an extent of the pointer-to-shadow distance obtained in the obtaining step S830.

Figure 11C:
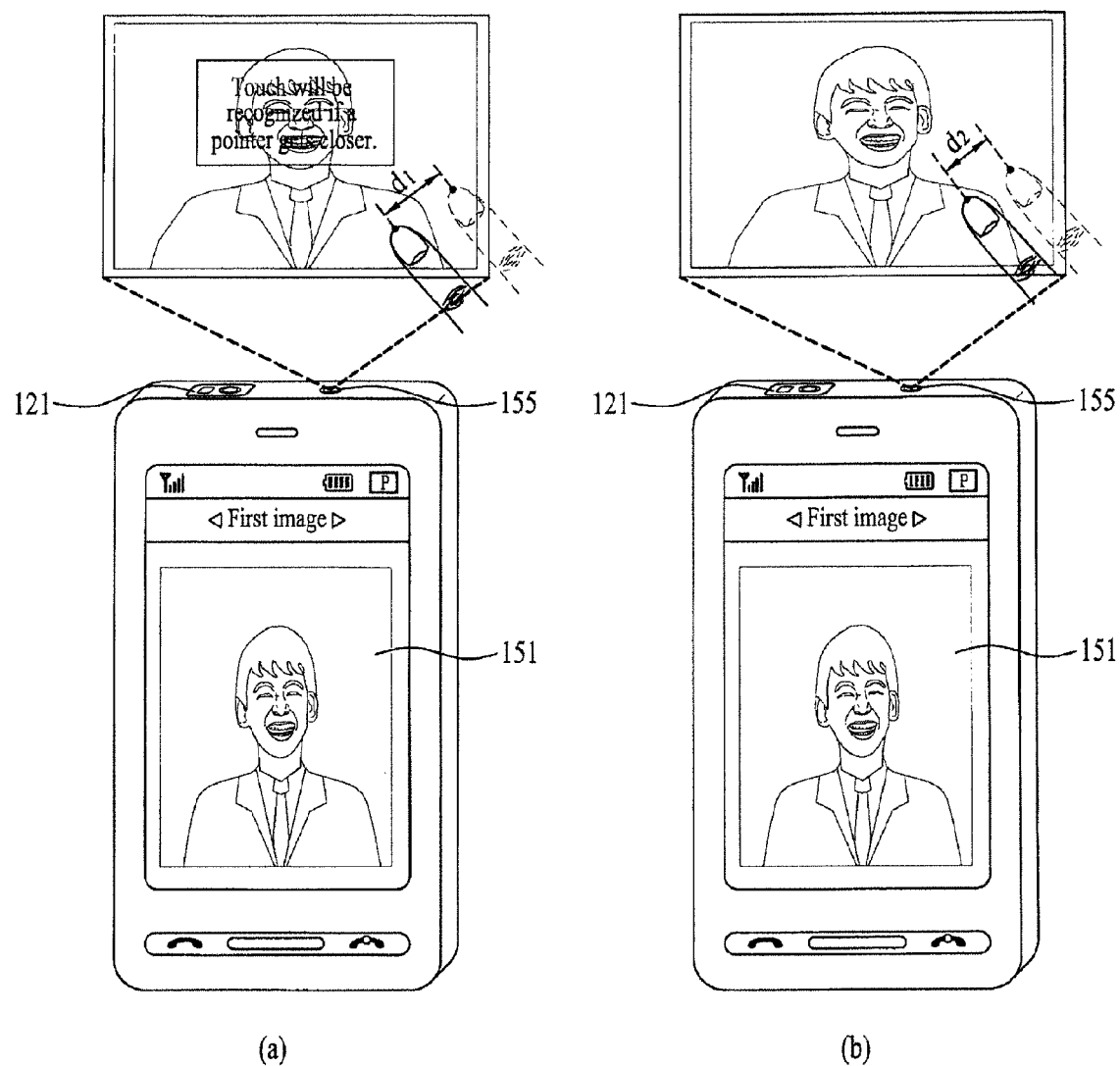

For instance, referring to FIG. 11C, if an obtained distance between a pointer and a shadow is d1, the mobile terminal 100 outputs a text announcing that a touch becomes recognizable if the pointer gets closer to an external image [(a) of FIG. 11C]. If an obtained distance between a pointer and a shadow is d2 (<d1), the mobile terminal 100 is able to recognize a touch to the point of the external image pointed by the pointer.

The mobile terminal 100 is able to obtain distances between a plurality of pointers located over an external image and their shadows in the obtaining step S830, and is then able to recognize a touch to each of a plurality of the pointers.

Figure 12A:
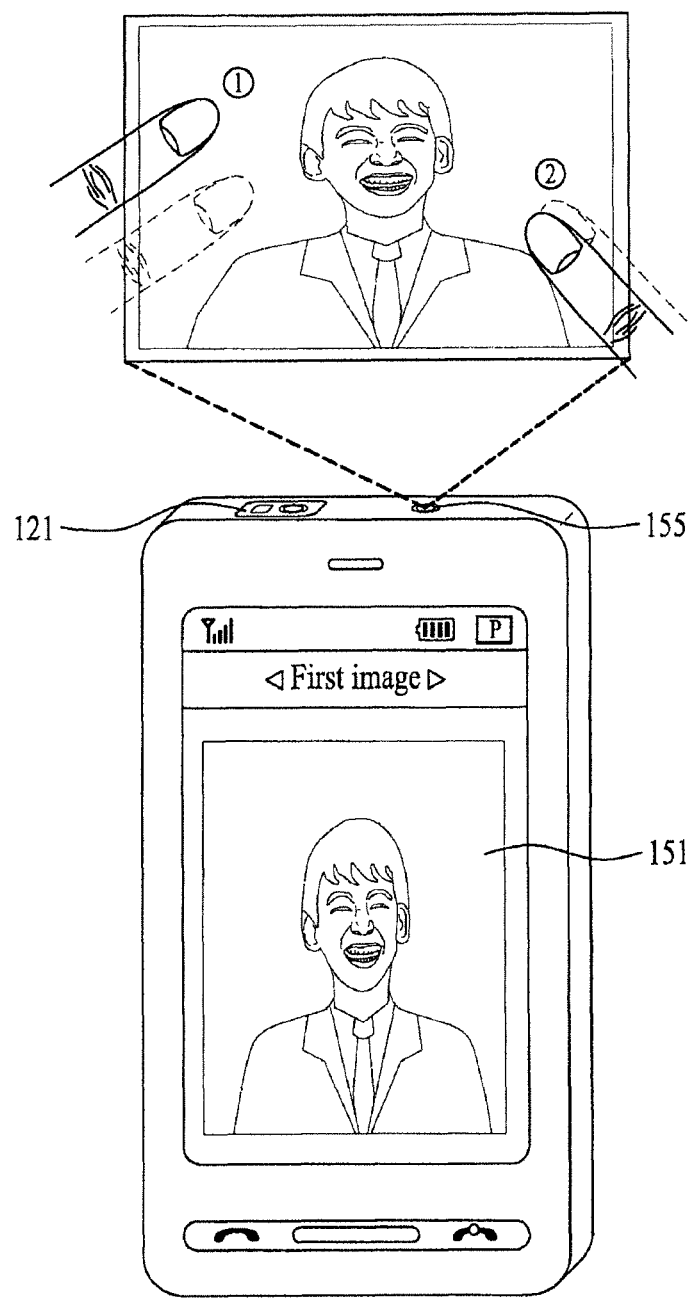
FIG. 12A and FIG. 12B are diagrams for a touch recognizing process when there are two pointers according to one embodiment of the present invention.

For instance, referring to FIG. 12A, if a distance between a first pointer (1) and its shadow exceeds a touch recognizable distance and if a distance between a second pointer (2) and its shadow is less than or equal to the touch recognizable distance, the mobile terminal 100 is able to recognize a touch to a point indicated by the second pointer (2) only.

Figure 12B:
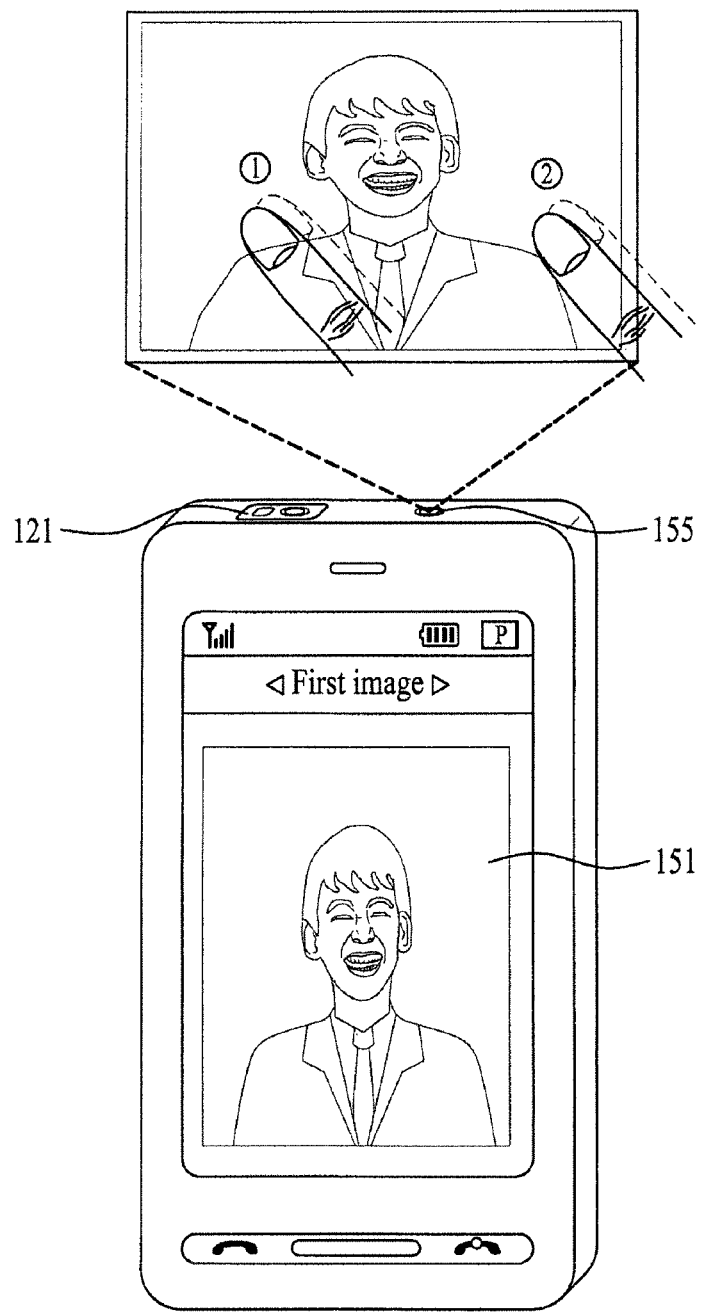

For instance, referring to FIG. 12B, if a distance between a first pointer (1) and its shadow is less than or equal to a touch recognizable distance and if a distance between a second pointer (2) and its shadow is less than or equal to the touch recognizable distance, the mobile terminal 100 is able to recognize touches to points indicated by the first and second pointers (1) and (2), respectively.

Under the control of the controller 180, the mobile terminal 100 is able to perform an operation corresponding to the touch point recognized in the recognizing step S840 [S870].

For instance, with reference to the touch point recognized in the recognizing step S840, the mobile terminal 100 is able to perform at least one of reducing/enlarging an external image portion display, driving an application, and executing data.

Figure 13A:
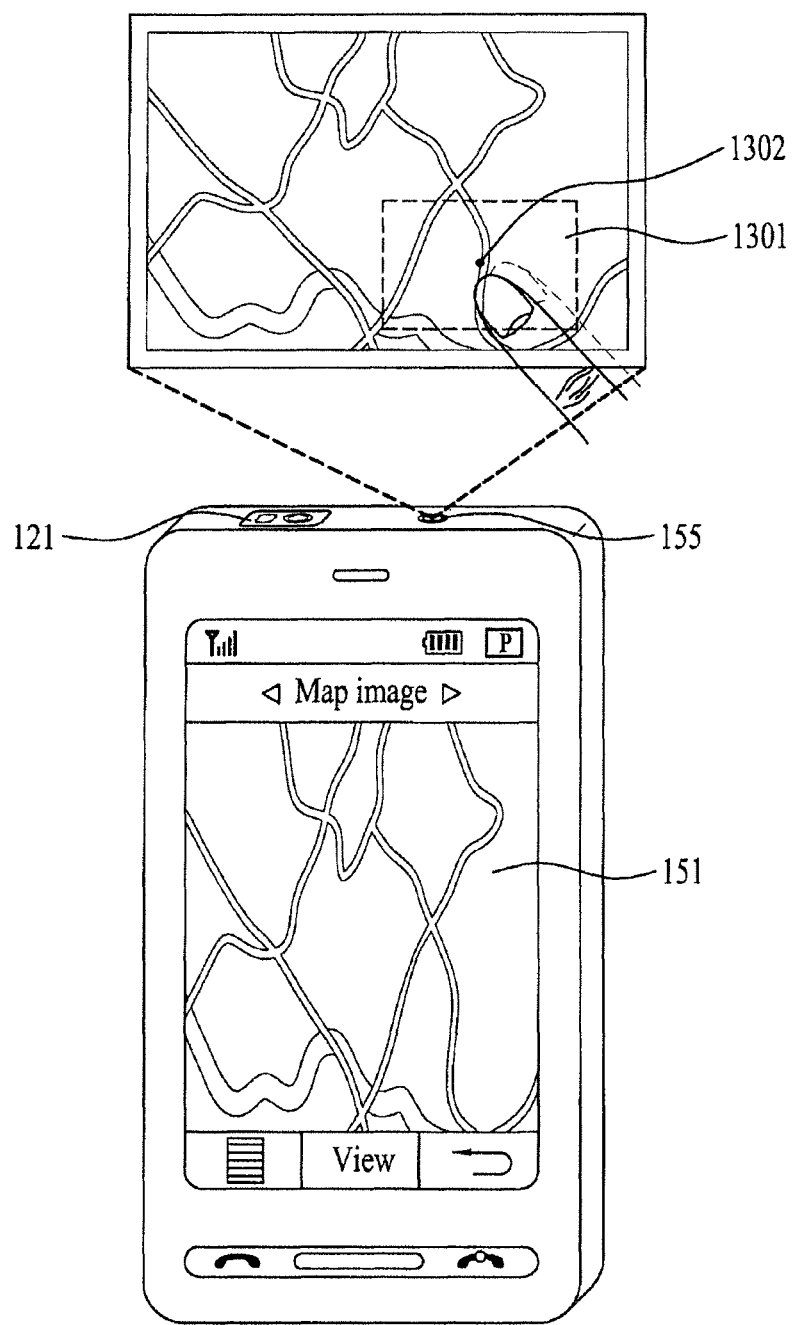
FIG. 13A, FIG. 13B, and FIG. 13C are diagrams for an enlarged/reduced image displayed on an external screen with reference to a touch point according to one embodiment of the present invention.
Figure 13B:
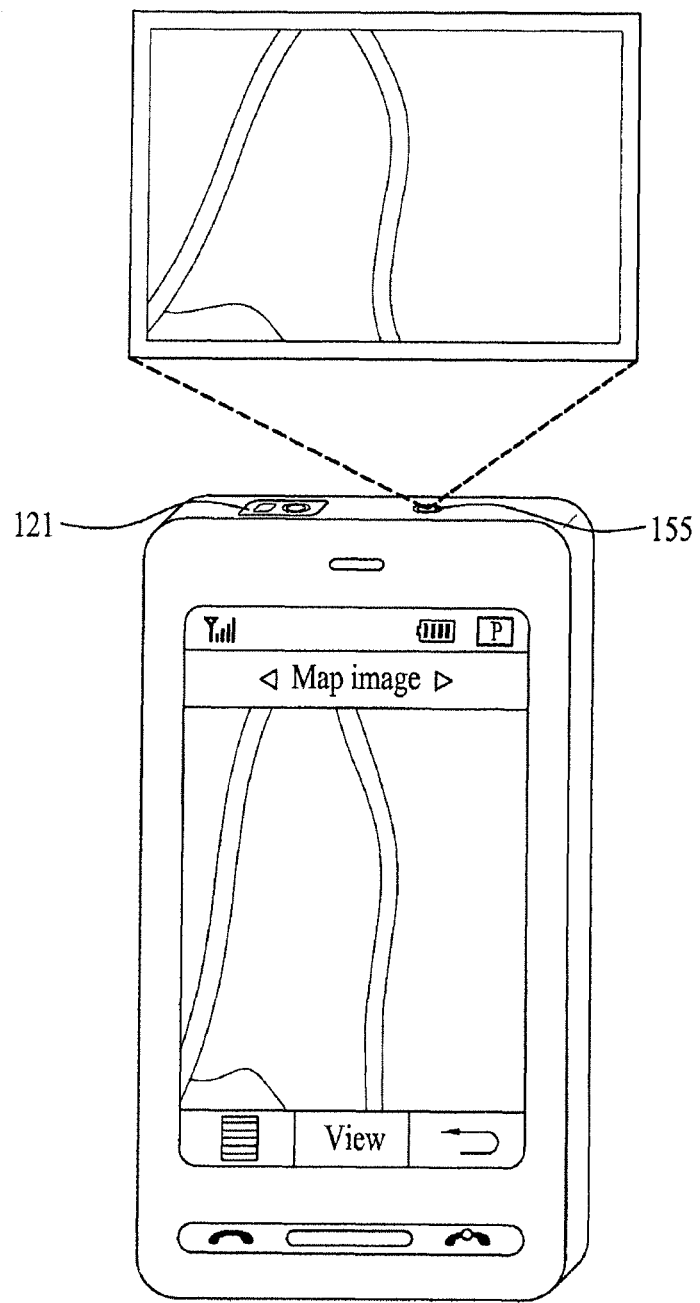
Figure 13C:
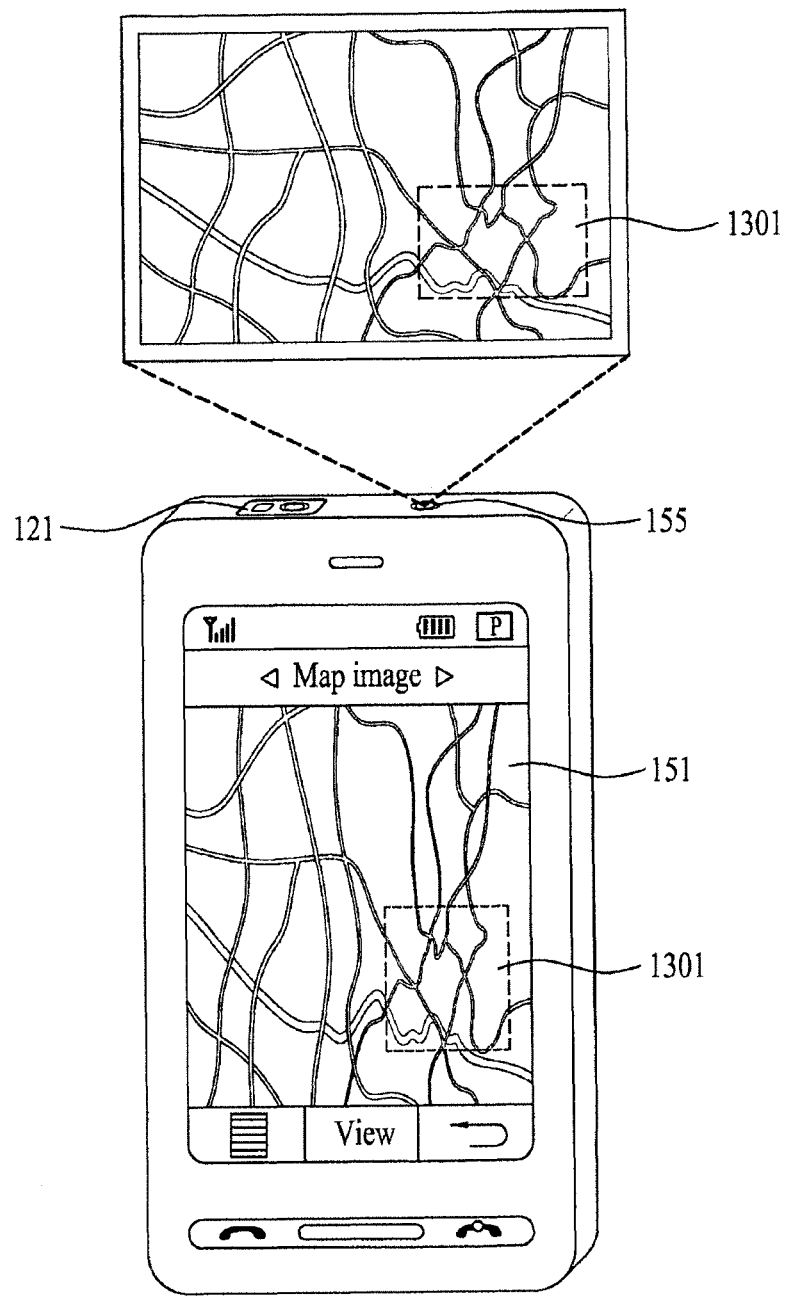

In the following description, such a teaching is explained in detail with reference to FIGS. 13A to 15B. Referring to FIGS. 13A to 13C, if a touch of a pointer to a prescribed point of an external image [FIG. 13A] is recognized, the mobile terminal 100 enlarges and displays the external image [FIG. 13B] or reduces and displays the external image [FIG. 13C], with reference to one area 1301 centering on the touch point.

In particular, an image part within the area 1301 is displayed as a full image [FIG. 13B] or a whole external image can be displayed within the area 1301 [FIG. 13C].

Referring again to FIG. 13A, in another exemplary embodiment, when a touch of a pointer is recognized, a pointer cursor 1302 is displayed at the location of the touch of the pointer. Providing a pointer cursor 1302 allows the user to see the precise point recognized as being touch. Further, once the pointer cursor 1302 is displayed, if the user desires, the user may change the location of the pointer cursor 1302 by moving the pointer correspondingly. As such, if the pointer is a finger, the pointer cursor 1302 will move according to the finger movement.

Figure 14A:
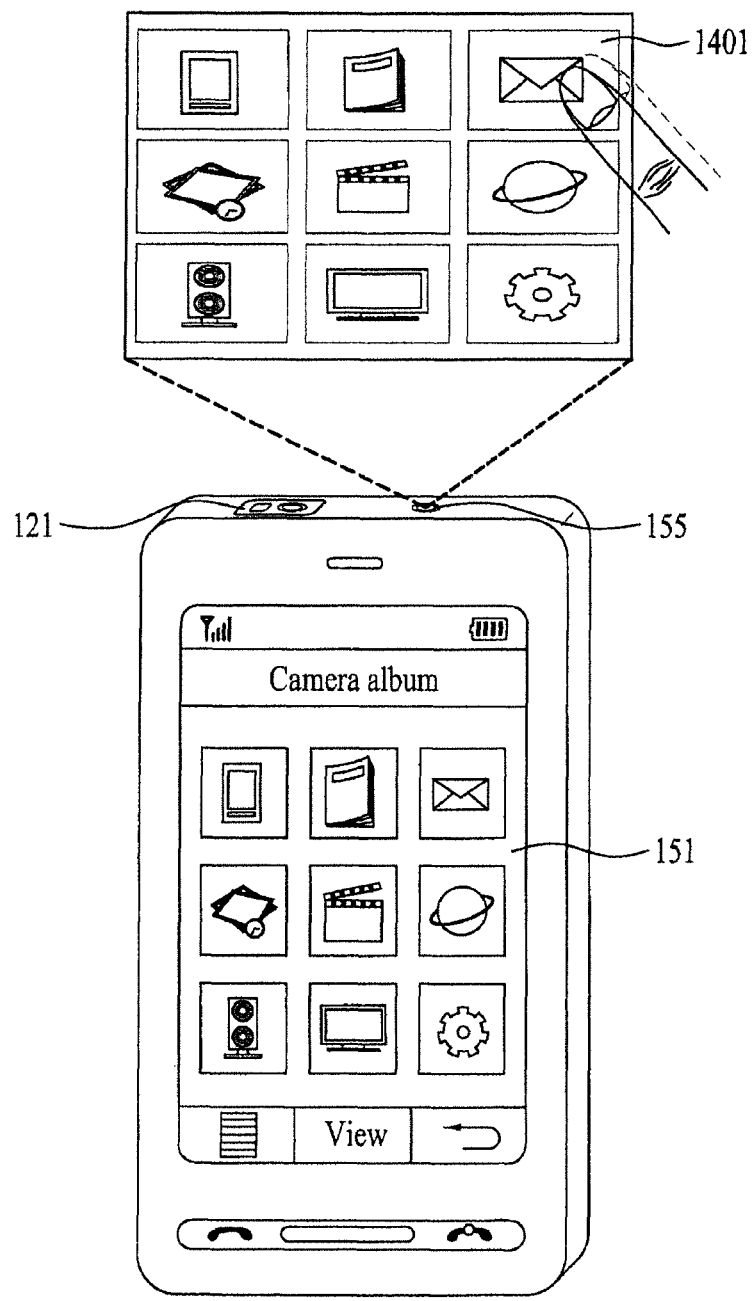
FIG. 14A and FIG. 14B are diagrams for displaying an image on an external screen by driving an application with reference to a touch point according to one embodiment of the present invention.
Figure 14B:
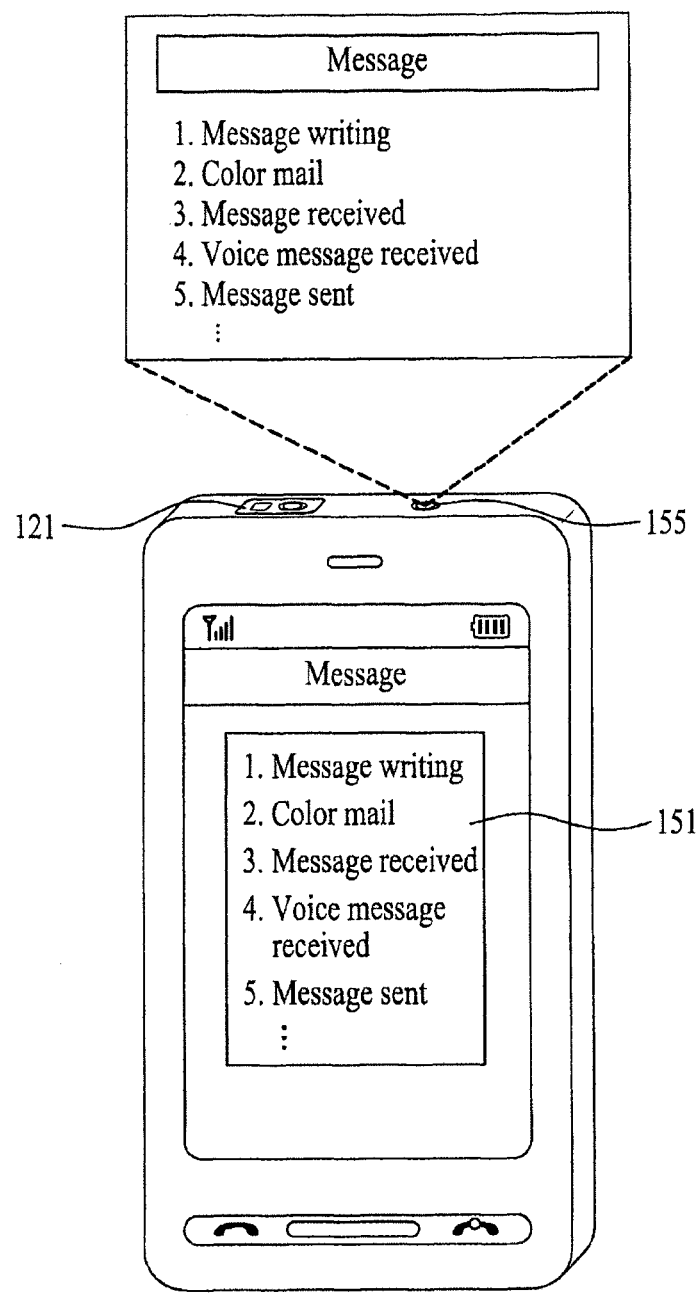

Referring to FIG. 14A and FIG. 14B, if a touch to a message icon 1401 in an external image including application icons [FIG. 14A] is recognized, the mobile terminal 100 drives a message relevant application and is then able to display a corresponding external image [FIG. 14B].

In this case, the application is a function, which is drivable using the mobile terminal 100, and includes a message relevant application, a multimedia relevant application, a call relevant application, or an Internet relevant application.

Referring to FIG. 14B, if a touch to 'message writing' in an external image is recognized, the mobile terminal 100 is able to display an image including a window for message writing as an external image.

Figure 15A:
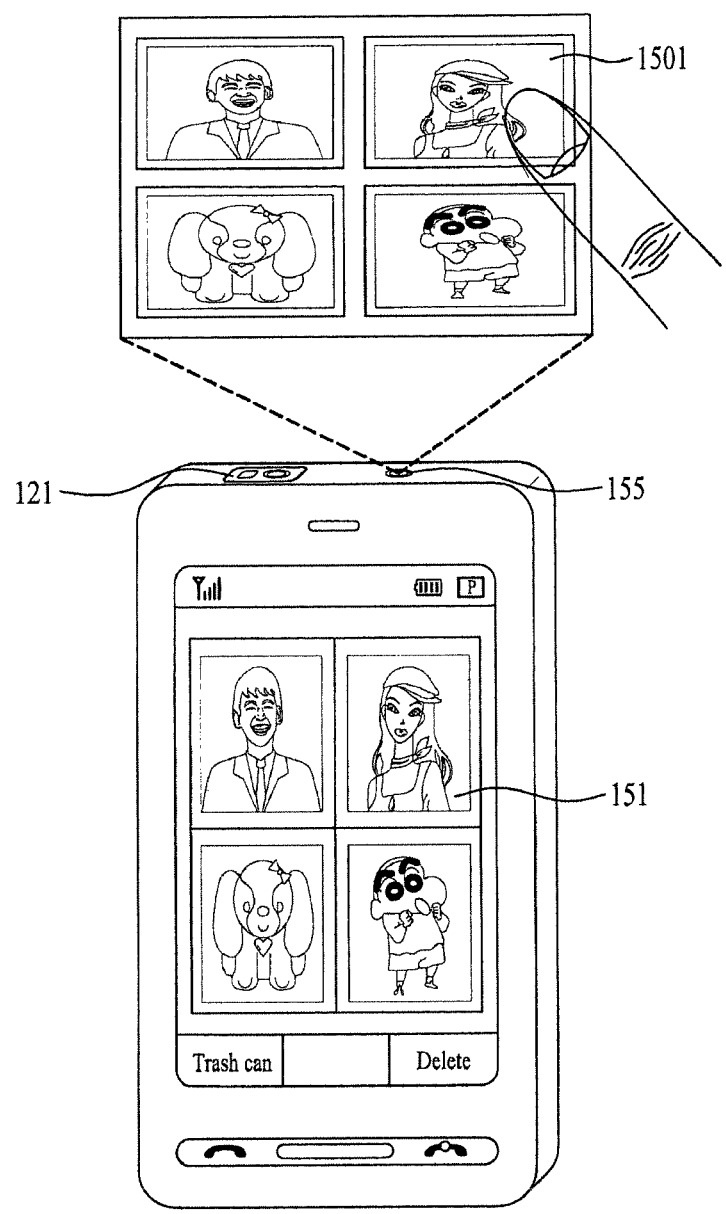
FIG. 15A and FIG. 15B are diagrams for displaying an image on an external screen by executing data with reference to a touch point according to one embodiment of the present invention.
Figure 15B:
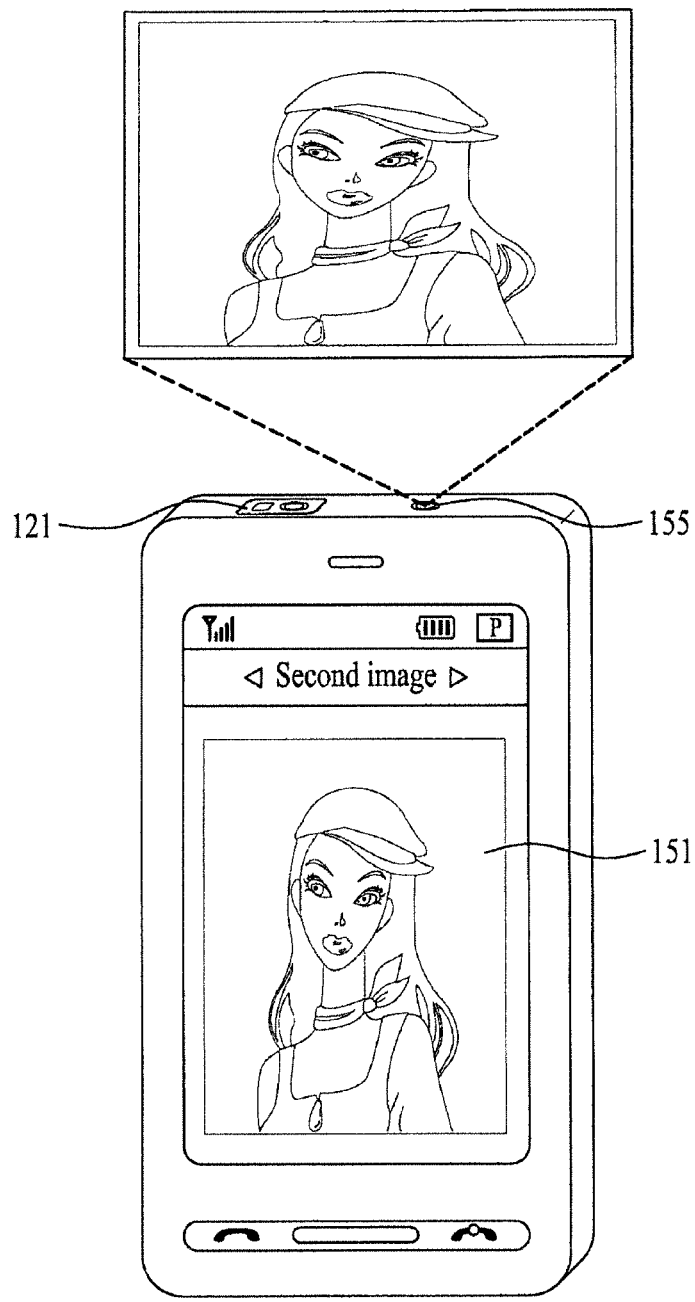

Referring to FIG. 15A and FIG. 15B, if a touch to a second photo 1501 in an external image including a plurality of photos displayed as thumbnails [FIG. 15A] is recognized, the mobile terminal 100 is able to display the second photo as an external image [FIG. 15B].

If photo data, moving picture data, or document data are included formatted as a text list in an external image, the mobile terminal 100 runs data to which a recognized touch point in the text list belongs and is then able to display a corresponding image as an external image.

Referring now to FIG. 8, under the control of the controller 180, if a touch is recognized to at least one point of an external image in the recognizing step S840, the mobile terminal 100 is able to acquire at least one of touch point information and size information of a pointer when recognizing a touch to at least one point from an input image [S850].

At least one of the touch point information and the size information of the pointer acquired in the acquiring step S850 can be stored in the memory 160. Using the acquired touch point information and the acquired size information, the mobile terminal 100 is able to obtain a position and size of the pointer on the external image or the input image.

Even if the pointer is located such that a touch recognition cannot be made from an external image, the mobile terminal 100 is able to acquire point information and size information of the pointer from an input image.

Using at least one of the touch point information (or point information) and the size information of the pointer acquired in the acquiring step S850, the mobile terminal 100 is able to obtain a touch pattern created by the pointer [S860].

The touch pattern may be a touch & drag, a touch count, or a touch duration. Under the control of the controller 180, the mobile terminal 100 is able to perform an operation corresponding to the touch pattern obtained in the obtaining step S860 [S870].

Such a teaching is explained in detail with reference to FIGS. 16 to 19B as follows. For clarity and convenience of description, assume that a plurality of input images can be sequentially inputted via the camera 121.

Figure 16:
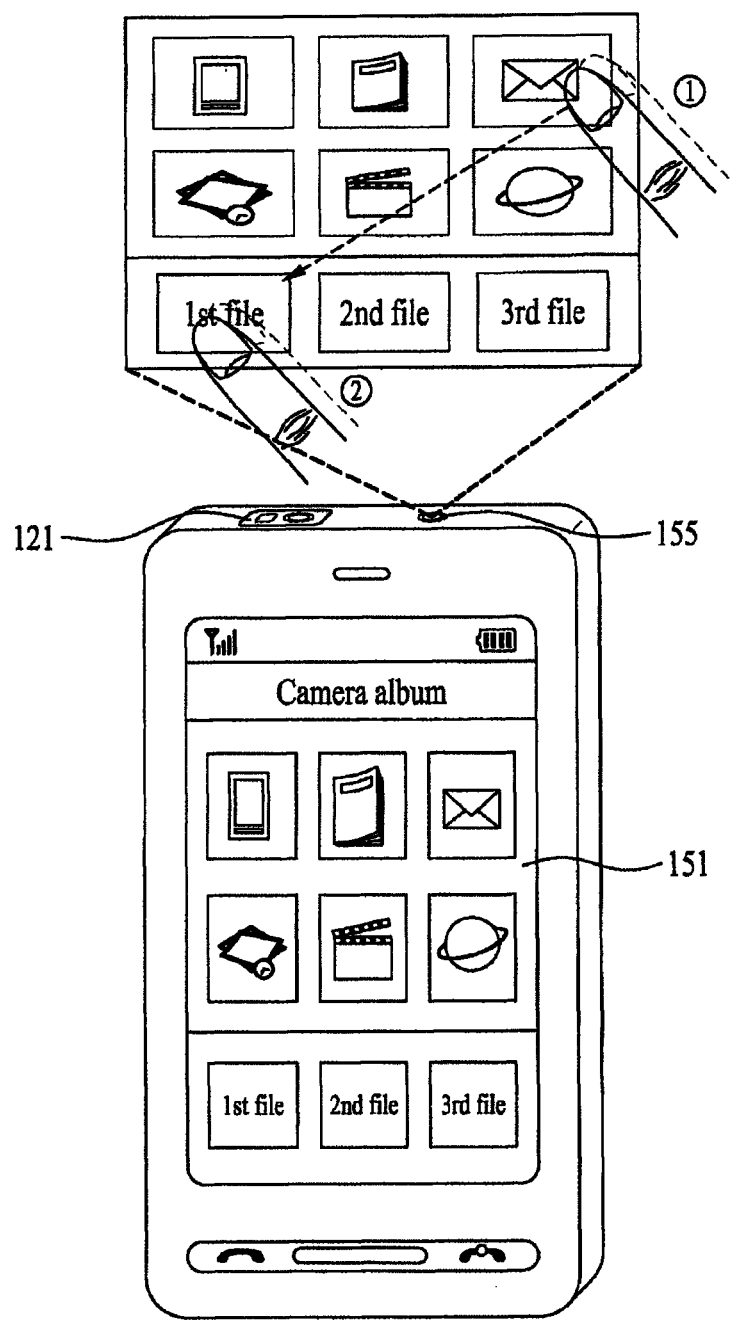
FIG. 16 is a diagram for recognizing a touch & drag using touch point information of a pointer and size information according to one embodiment of the present invention.

Referring to FIG. 16, if a touch point or size of a pointer (2) acquired from a second input image is different from a touch point of a pointer (1) acquired from a first input image or is equal to a size of the pointer (1), the mobile terminal 100 is able to obtain a touch & drag of a pointer to an external image. Therefore, the mobile terminal 100 is able to perform an operation corresponding to the touch & drag.

For instance, if a touch & drag is made to a specific file from a specific photo among a plurality of photos, the mobile terminal 100 performs an operation corresponding to the touch & drag in a manner that the specific photo is included in the specific file.

Figure 17A:
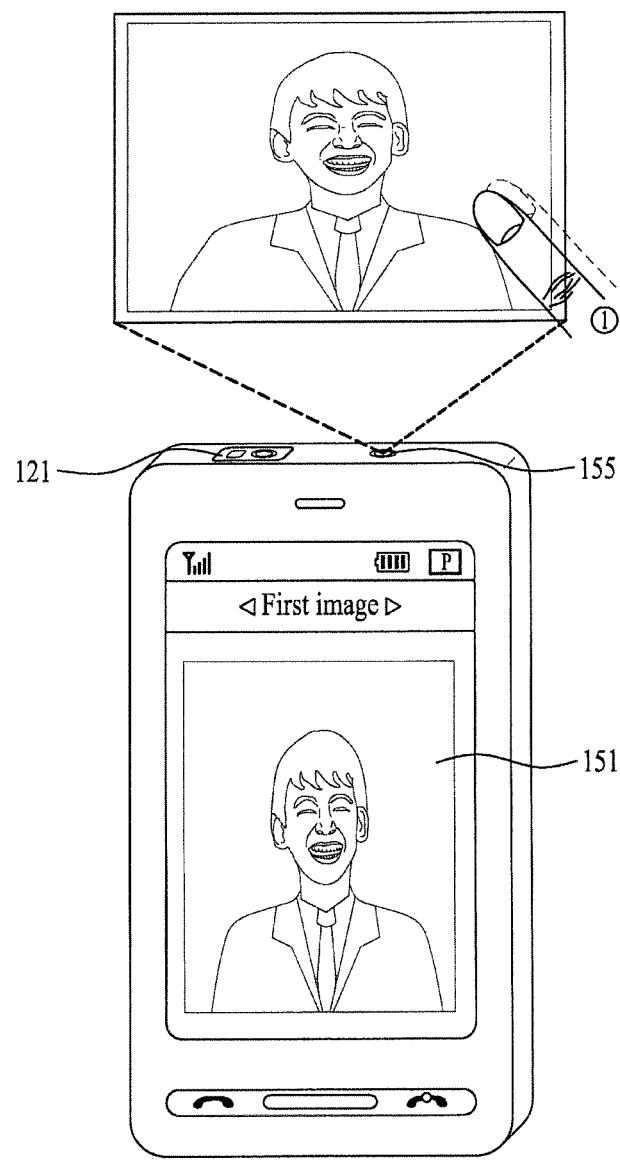
FIG. 17A and FIG. 17B are diagrams for recognizing a touch count and a touch duration using touch point information of a pointer and size information according to one embodiment of the present invention.
Figure 17B:
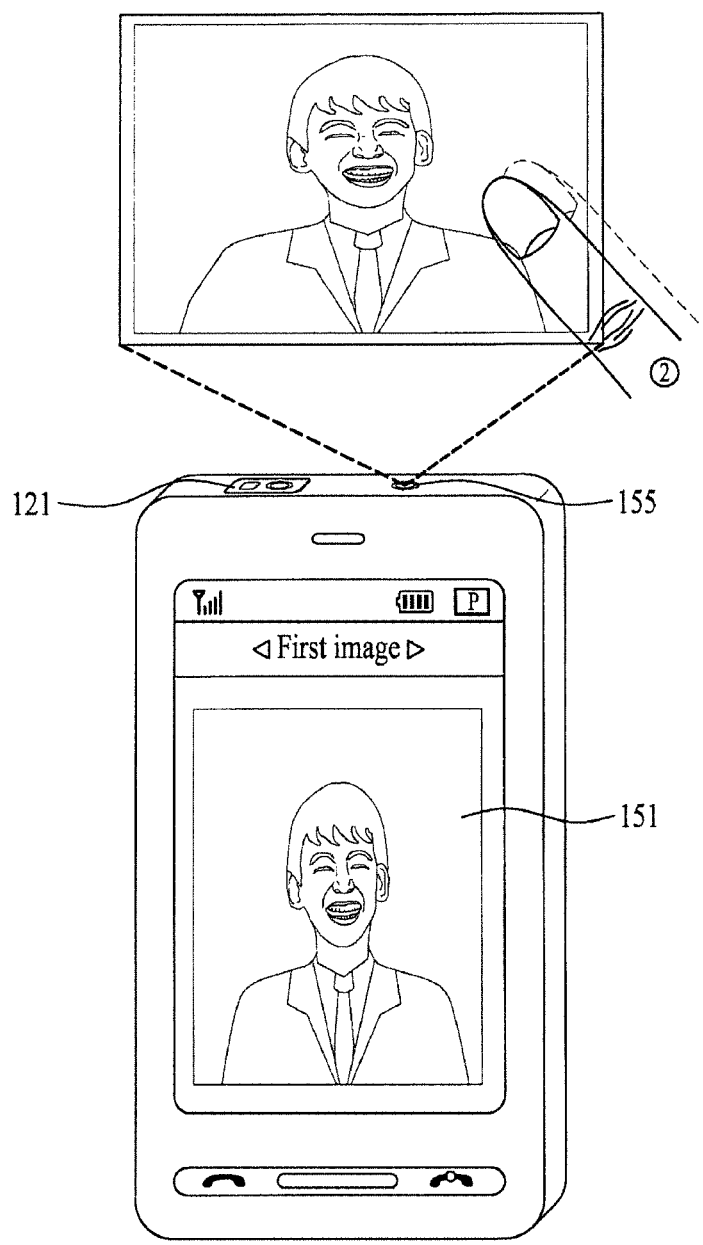

Referring to FIG. 17A and FIG. 17B, the mobile terminal 100 acquires touch point information and size information of a pointer (1) located within a touch recognizable distance from a first input image [FIG. 17A] and is able to acquire touch point information and size information of a pointer (2) located in a touch recognition unavailable distance from a second input image [FIG. 17B].

For instance, if a position or size of the pointer (2) acquired from the second input image is equal to a position of the pointer (1) acquired from the first input image but is greater than a size of the pointer (1), the mobile terminal 100 is able to obtain a touch release after a touch to one point of an external image for a first duration (e.g., short touch once).

Therefore, the mobile terminal 100 is able to perform an operation corresponding to the touch release after the first duration. In this case, the first duration may be a period of touched time for the short touch.

Referring to FIG. 17A, if touch points and sizes of the pointer (1) acquired from first and second input images sequentially inputted are equal to each other, the mobile terminal 100 is able to obtain a touch to a touch point for a second duration (e.g., long touch).

Therefore, the mobile terminal 100 is able to perform an operation corresponding to the touch for the second duration. In this case, the second duration may mean a period of touched time for the long touch.

Referring to FIG. 17A and FIG. 17B, although the positions of the pointer from the sequentially inputted first and second input images are identical, if the sizes of the pointer vary in order of a first size (size in a touch recognizable distance), a second size (size in a touch recognition unavailable distance) and the first size according to the first and second input images, respectively, the mobile terminal 100 is able to obtain two touches to a prescribe point of an external image. Therefore, the mobile terminal 100 is able to perform an operation corresponding to the two touched performed twice.

Referring now to FIG. 8, using at least one of the touch point information and the size information acquired in the acquiring step S850, the mobile terminal 100 is able to adjust a size of the external image in the performing step S870. In the following description, such a teaching is explained in detail with reference to FIGS. 18A to 19B. For clarity and convenience of the following description, assume that a plurality of input images can be inputted via the camera 121. Assume also that an operation for enabling a pointer to get farther from or closer to an external screen corresponds to an external image enlarging or reducing command.

Figure 18A:
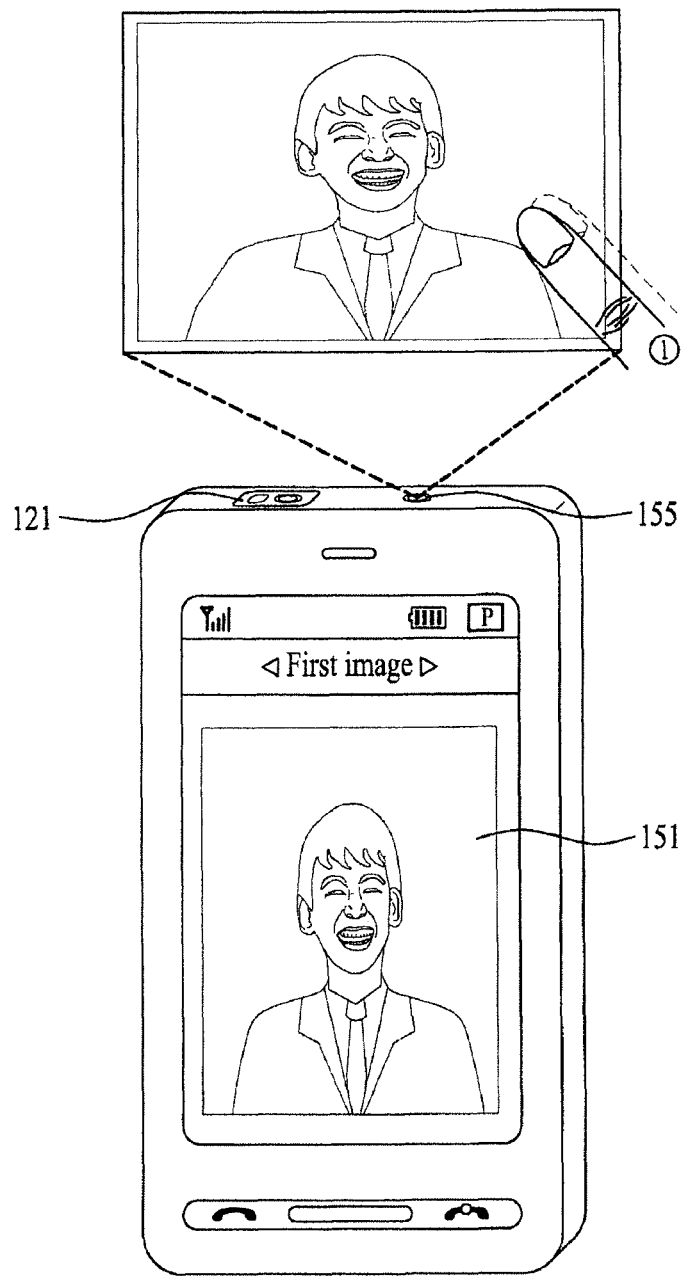
FIG. 18A and FIG. 18B are diagrams for enlarging and displaying an image on an external screen using touch point information of a pointer and size information according to one embodiment of the present invention.
Figure 18B:
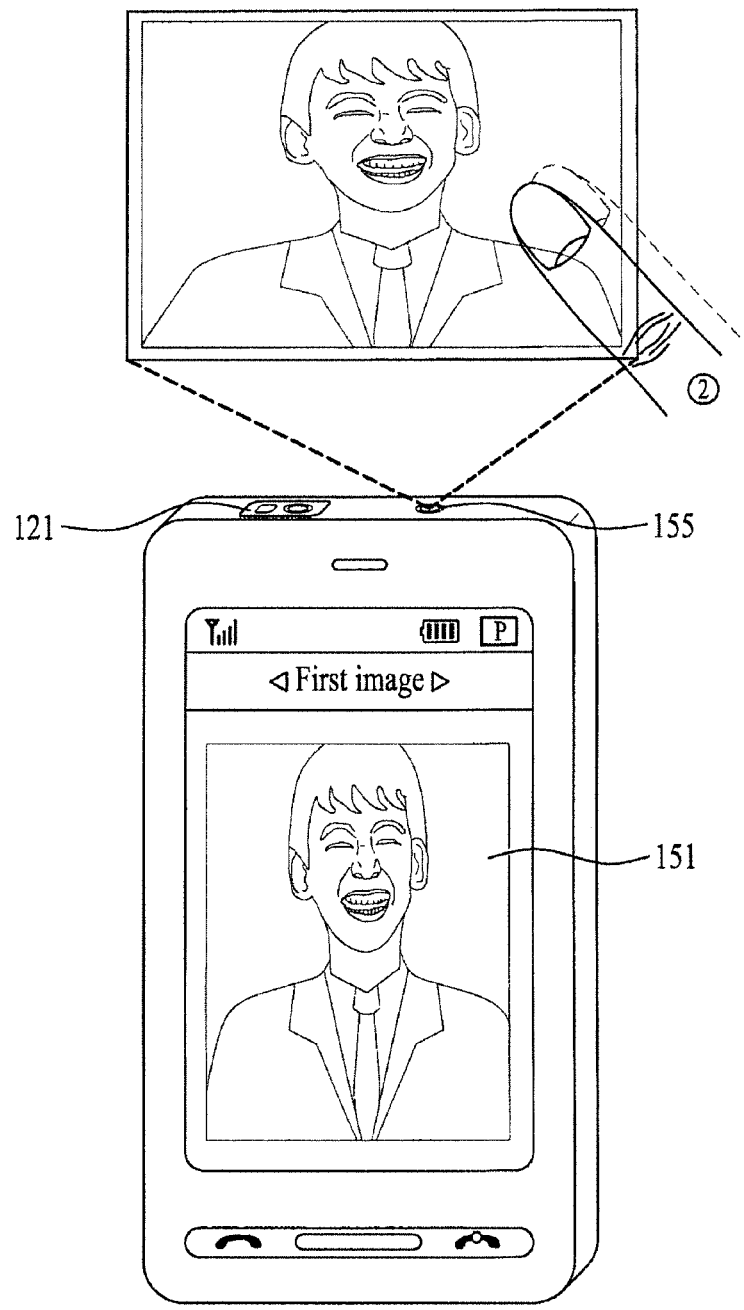

Referring to FIG. 18A and FIG. 18B, if a position or size of a pointer (2) acquired from a second input image is equal to a position of a pointer (1) acquired from a first input image but is greater than a size of the pointer (1) (i.e., the pointer gets farther from an external screen), the mobile terminal 100 is able to enlarge and display an external image.

Figure 19A:
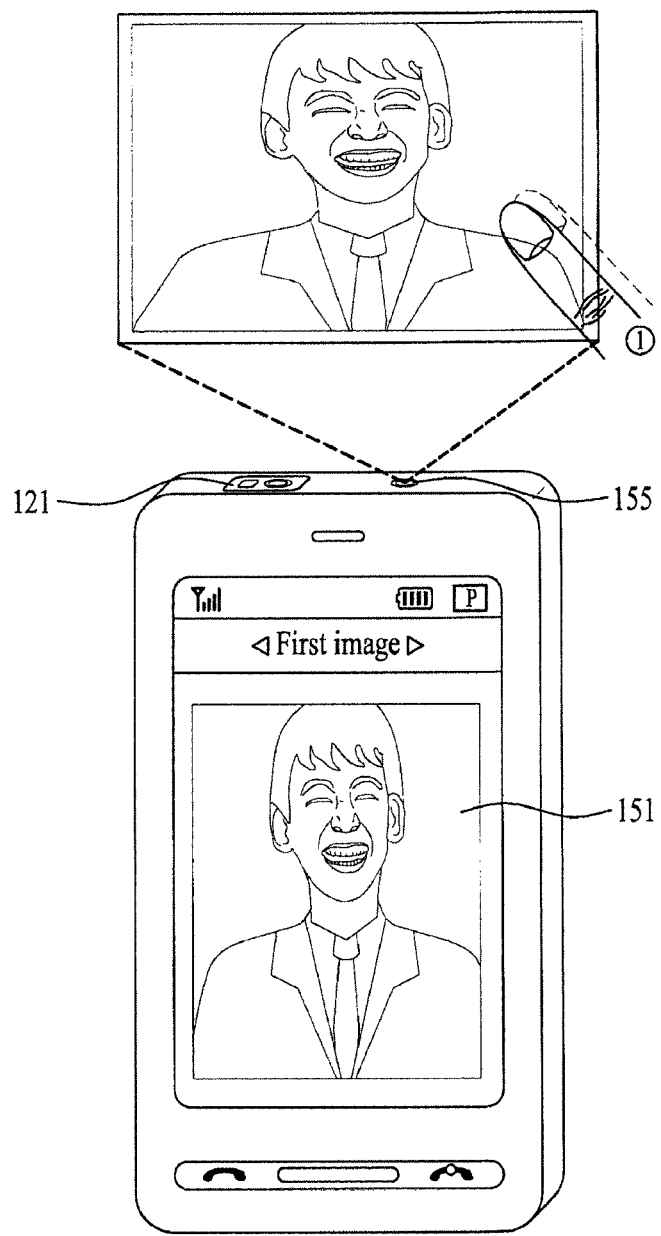
FIG. 19A and FIG. 19B are diagrams for reducing and displaying an image on an external screen using touch point information of a pointer and size information according to one embodiment of the present invention.
Figure 19B:
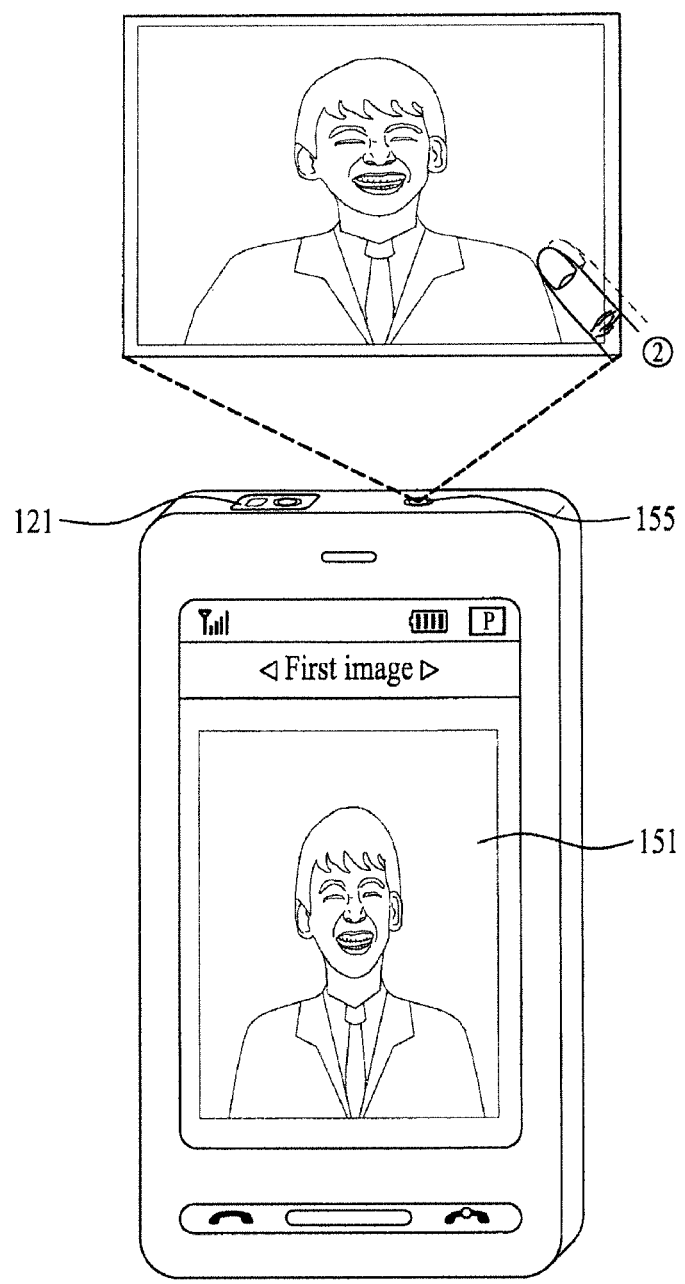

Referring to FIG. 19A and FIG. 19B, if a position or size of a pointer (2) acquired from a second input image is equal to a position of a pointer (1) acquired from a first input image but is smaller than a size of the pointer (1) (i.e., the pointer gets closer to an external screen), the mobile terminal 100 is able to reduce and display an external image.

Referring now to FIG. 8, if a motion of the pointer is obtained in the obtaining step S830 (assume that a distance between a pointer and a shadow lies within a touch recognizable distance), the mobile terminal 100 is able to add a specific image effect to an external image to correspond to the obtained motion or is able to execute a specific function. Such teachings are explained in detail with reference to FIGS. 20A to 21B as follows.

Figure 20A:
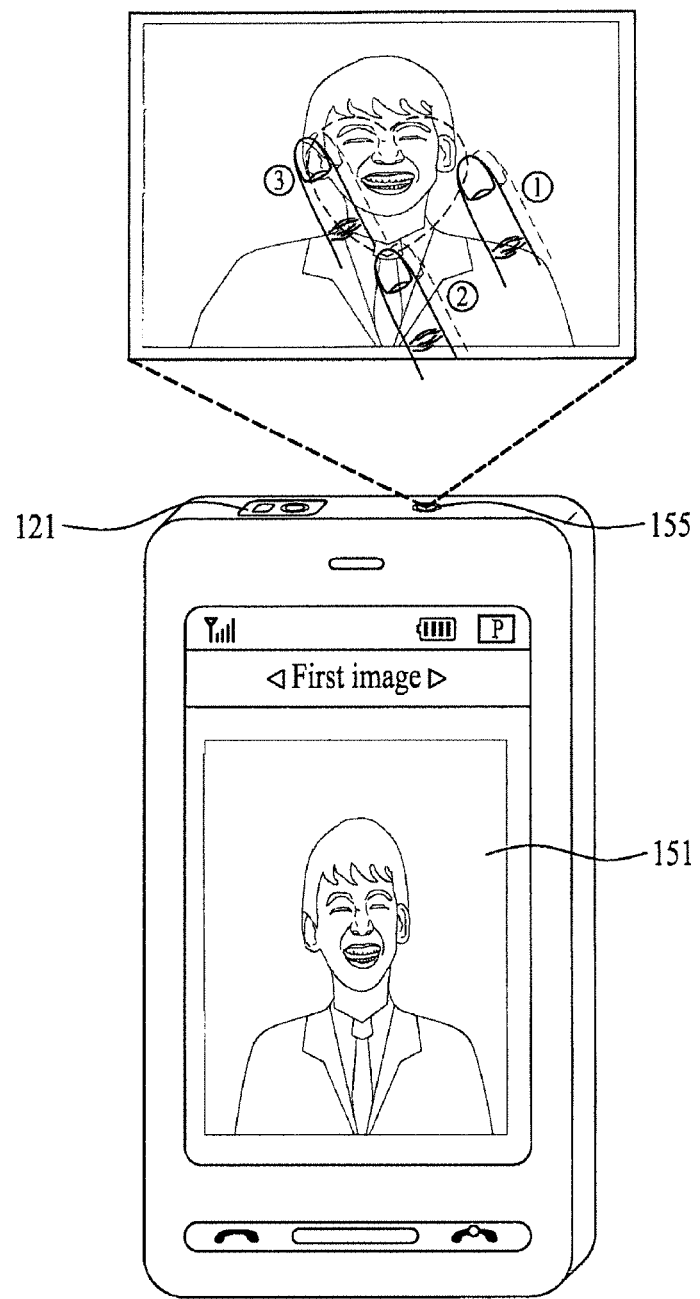
FIG. 20A and FIG. 20B are diagrams for displaying an image, to which an image effect attributed to a motion of a pointer is added, on an external screen according to one embodiment of the present invention.
Figure 20B:
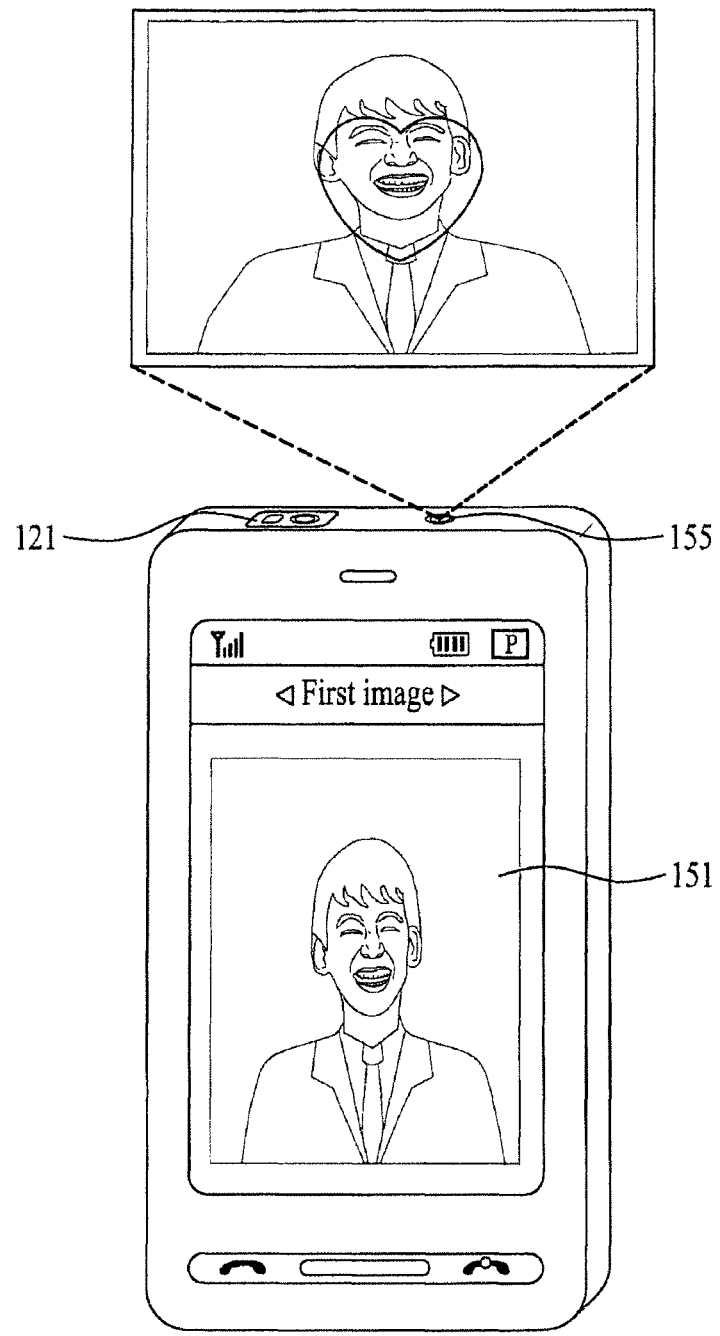

Referring to FIG. 20A and FIG. 20B, if a pointer motion is obtained for an image effect addition within a touch recognizable distance, the mobile terminal 100 is able to add an image effect corresponding to the pointer motion to an external image.

Figure 21A:
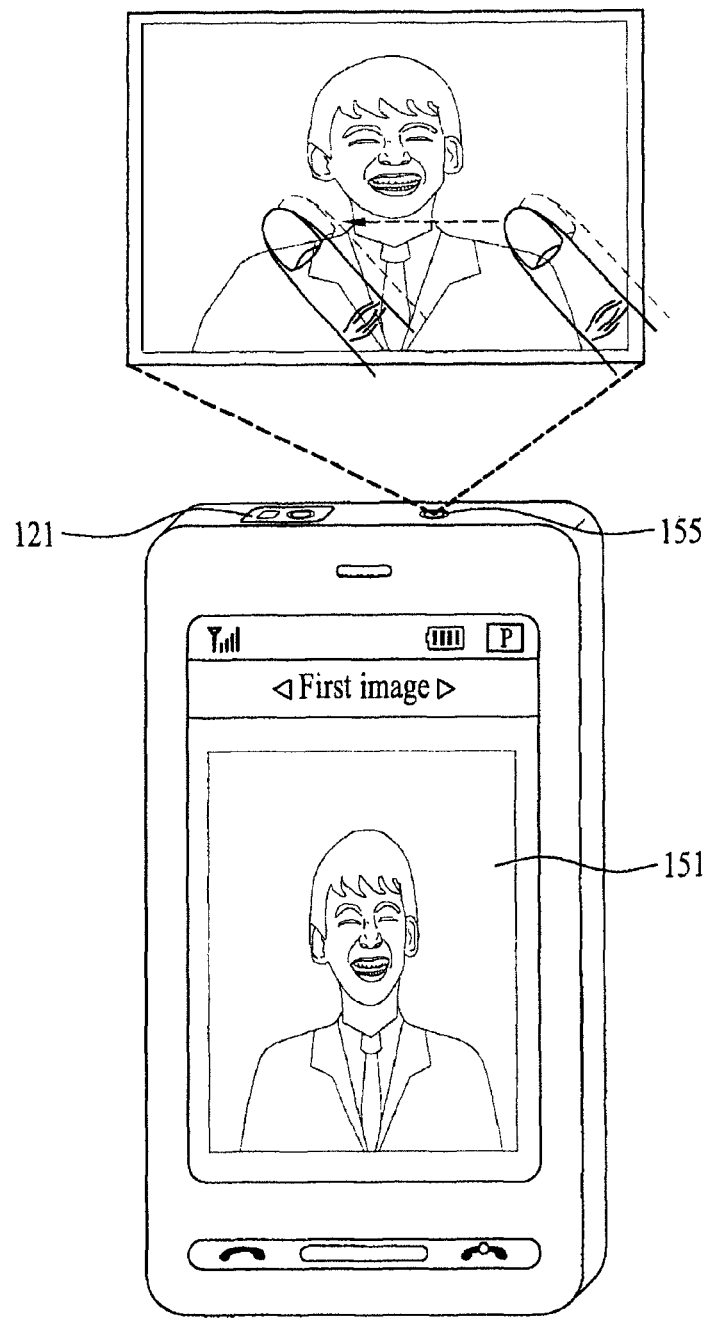
FIG. 21A and FIG. 21B are diagrams for displaying an image, which corresponds to a specific function execution attributed to a motion of a pointer, on an external screen according to one embodiment of the present invention.
Figure 21B:
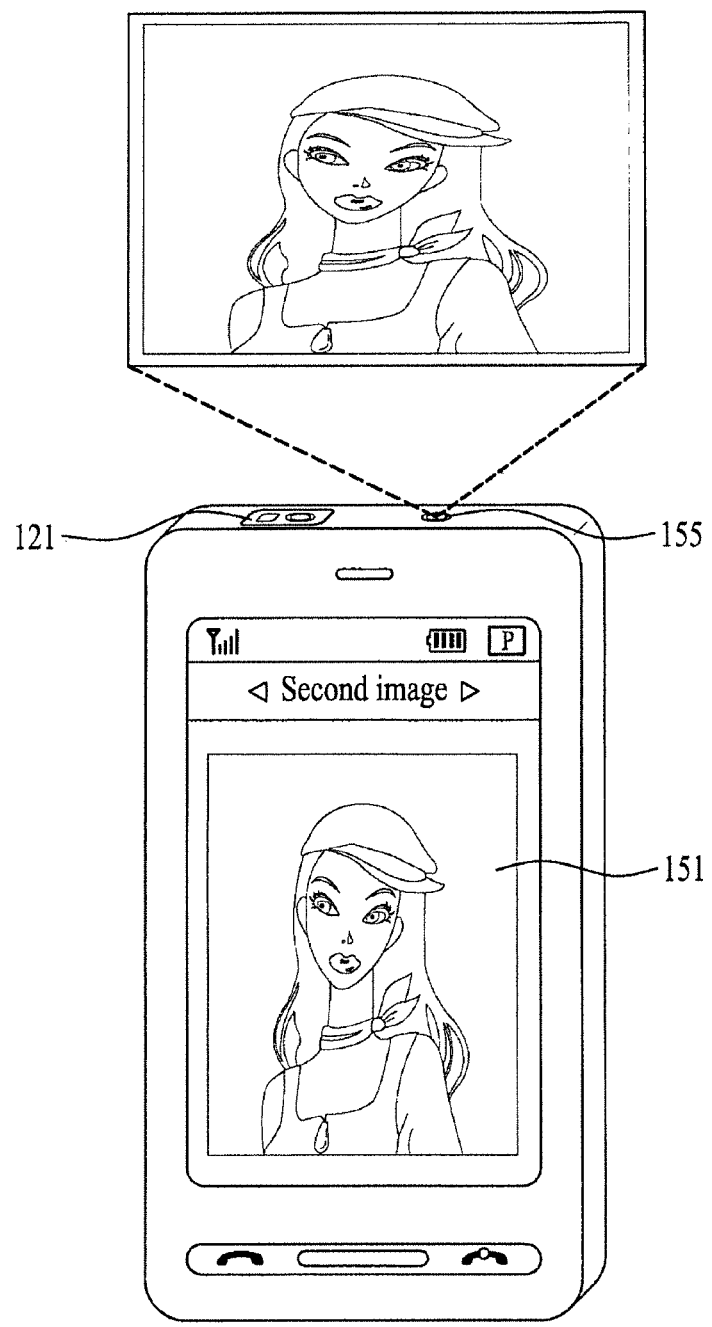

Referring to FIG. 21A and FIG. 21B, if a pointer motion is obtained corresponding to a specific function execution in a touch recognizable distance, the mobile terminal 100 executes a specific function corresponding to the pointer motion and is able to display a corresponding external image.

For instance, when a specific function is 'turn a page', and a pointer motion corresponding to the page turning is recognized, the mobile terminal 100 is able to display a second image, which is next to a first image, as an external image.

Referring now to FIG. 8, the mobile terminal 100 obtains an extent of overlapping of an external image with an external object from an input image in the obtaining step S830 and is then able to adjust a size of the external image according to the obtained overlapped extent. Such a teaching is explained in detail with reference to FIG. 22A and FIG. 22B.

Figure 22A:
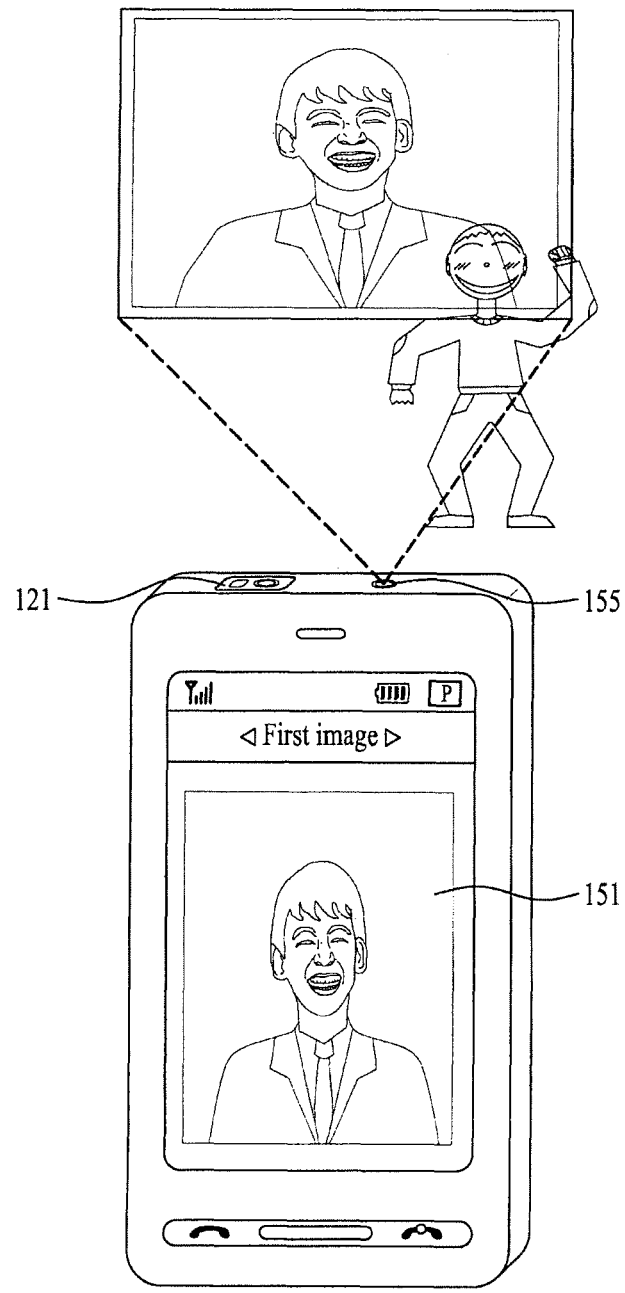
FIG. 22A and FIG. 22B are diagrams for enlarging/reducing and displaying an image to a covered extent of an image displayed on an external screen according to one embodiment of the present invention.
Figure 22B:
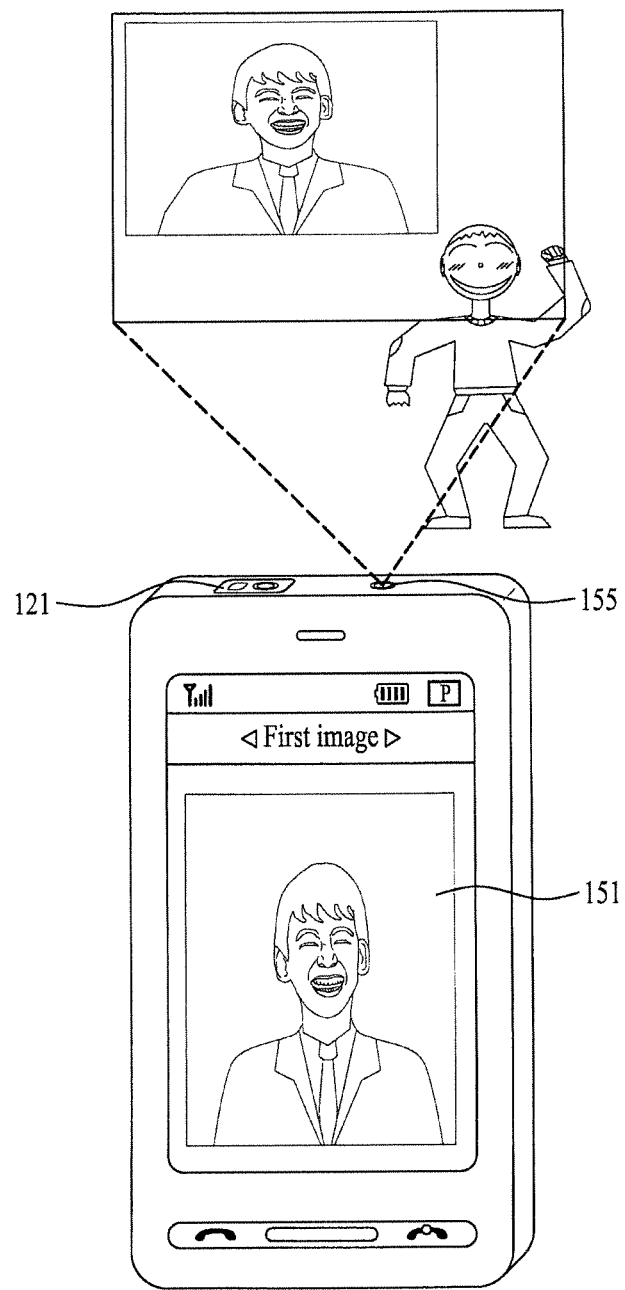

Referring to FIG. 22A and FIG. 22B, if an external image is overlapped with a specific person, the mobile terminal 100 is able to reduce and to display the external image to avoid the effect of overlapping with the specific person.

While an external image is reduced and displayed, if a position of a specific person is shifted, the mobile terminal 100 is able to enlarge and display the external image within a range of avoiding the effect of the overlapping with the specific person.

According to one embodiment of the present invention, the above-described touch recognizing methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, and optical data storage devices and also include carrier-wave type implementations (e.g., transmission via Internet).

Accordingly, embodiments of the present invention provide the following effects and/or advantages. First, embodiments of the present invention enable a touch to be recognized using a pointer and its shadow images inputted via a camera provided to a mobile terminal. Therefore, the embodiments of the present invention provide for the recognition of a touch action to an external screen without a direct touch to a touchscreen, and thereby the performing of a corresponding operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a projector module configured to project an image for display on an external screen;
    a camera configured to receive an input image of the image displayed on the external screen, the input image including a pointer located over the image and a shadow of the pointer; and
    a controller configured to:
    obtain a distance between the pointer and the shadow of the pointer from the input image;
    recognize a touch by the pointer to a touch point in the displayed image according to the obtained distance;
    project through the projector module a pointer cursor at the touch point;
    perform an operation corresponding to the recognized touch point;
    recognize the touch by the pointer when the obtained distance is less than a threshold distance even when the distance between the pointer and the shadow of the pointer is not zero, and to not recognize the touch when the obtained distance is greater than the threshold distance; and
    cause displaying of text on the external screen when the obtained distance is greater than the threshold distance and less than a second threshold distance, the text indicating that a touch will be recognized when the distance between the pointer and the shadow of the pointer is less than the threshold distance.

2. The mobile terminal of claim 1, wherein the controller is further configured to recognize the touch by the pointer if a specific motion of the pointer is obtained from the input image when the obtained distance is less than the threshold distance.

3. The mobile terminal of claim 1, wherein the controller is further configured to acquire at least one of touch point information of the pointer or size information of the pointer and the shadow if the touch by the pointer is recognized to at least one point from the input image.

4. The mobile terminal of claim 3, wherein the controller is further configured to:
    obtain a touch pattern by the pointer using at least one of the acquired touch point information or the acquired size information; and
    perform the operation corresponding to the obtained touch pattern.

5. The mobile terminal of claim 3, wherein the controller is further configured to adjust a size of the image displayed on the external screen using at least one of the acquired touch point information or the acquired size information.

6. The mobile terminal of claim 1, wherein the controller is further configured to perform at least one of enlarging/reducing display of one portion of the image, driving an application, or executing data with reference to the recognized touch point.

7. The mobile terminal of claim 1, wherein the operation is at least one of a specific image effect addition or a specific function execution, the specific image effect addition being the display of an additional image on top of the image corresponding to the touch point and to a motion of the pointer, the specific function execution being the execution of a specific function associated with the touch point and the motion of the pointer.

8. The mobile terminal of claim 1, wherein the controller is further configured to determine an extent to which the displayed image overlaps with an external object from the input image and to adjust a size of the displayed image such that the displayed image does not overlap with the external object.

9. The mobile terminal of claim 1, wherein the controller is further configured to stop operating the camera if a touch by the pointer is not recognized for a predetermined period of time.

10. The mobile terminal of claim 1, wherein a lens of each of the projector module and the camera is configured to face a same direction.

11. The mobile terminal of claim 1, wherein location of the camera with respect to the projector is at a predetermined angle to detect the distance between the pointer and the shadow.

12. The mobile terminal of claim 1, wherein the controller is further configured to move the pointer cursor projected through the projector module corresponding to a motion of the pointer.

13. A method of recognizing a touch in a mobile terminal, the method comprising:
    projecting an image on an external screen;
    capturing the external screen to obtain an input image, the input image including a pointer located over the image and a shadow of the pointer;
    obtaining a distance between the pointer and the shadow from the input image;
    recognizing a touch by the pointer to a touch point in the displayed image according to the obtained distance;
    projecting a pointer cursor at the touch point; and
    performing an operation corresponding to the recognized touch point,
    wherein:
    the touch by the pointer is recognized when the obtained distance is less than a threshold distance even when the distance between the pointer and the shadow of the pointer is not zero and no touch is recognized when the obtained distance is greater than the threshold distance; and
    the method further comprises displaying text on the external screen when the obtained distance is greater than the threshold distance and less than a second threshold distance, the text indicating that a touch will be recognized when the distance between the pointer and the shadow of the pointer is less than the threshold distance.

14. The method of claim 13, further comprising recognizing the touch by the pointer if a specific motion of the pointer is obtained from the input image when the obtained distance is less than the threshold distance.

15. The method of claim 13, further comprising acquiring at least one of touch point information of the pointer or size information of the pointer and the shadow if the touch by the pointer is recognized to at least one point from the input image.

16. The method of claim 15, further comprising obtaining a touch pattern by the pointer using at least one of the acquired touch point information or the acquired size information and performing the operation corresponding to the obtained touch pattern.

17. The method of claim 15, further comprising adjusting a size of the image displayed on the external screen using at least one of the acquired touch point information or the acquired size information.

18. The method of claim 13, further comprising performing at least one of enlarging/reducing display of one portion of the image, driving an application, or executing data with reference to the recognized touch point.

19. The method of claim 13, wherein the operation is at least one of a specific image effect addition or a specific function execution, the specific image effect addition being the display of an additional image on top of the image corresponding to the touch point and to a motion of the pointer, the specific function execution being the execution of a specific function associated with the touch point and the motion of the pointer.

20. The method of claim 13, further comprising determining an extent to which the displayed image overlaps with an external object from the input image and adjusting a size of the displayed image such that the displayed image does not overlap with the external object.

21. The method of claim 13, further comprising stopping the capturing of the external screen if a touch by the pointer is not recognized for a predetermined period of time.

22. The method of claim 13, further comprising moving the projected pointer cursor corresponding to a motion of the pointer.

* * * * *